H. W. JONES.
NUT EQUIPPING MACHINE.
APPLICATION FILED JUNE 21, 1918.
1,369,894.
Patented Mar. 1, 1921.
18 SHEETS—SHEET 1.
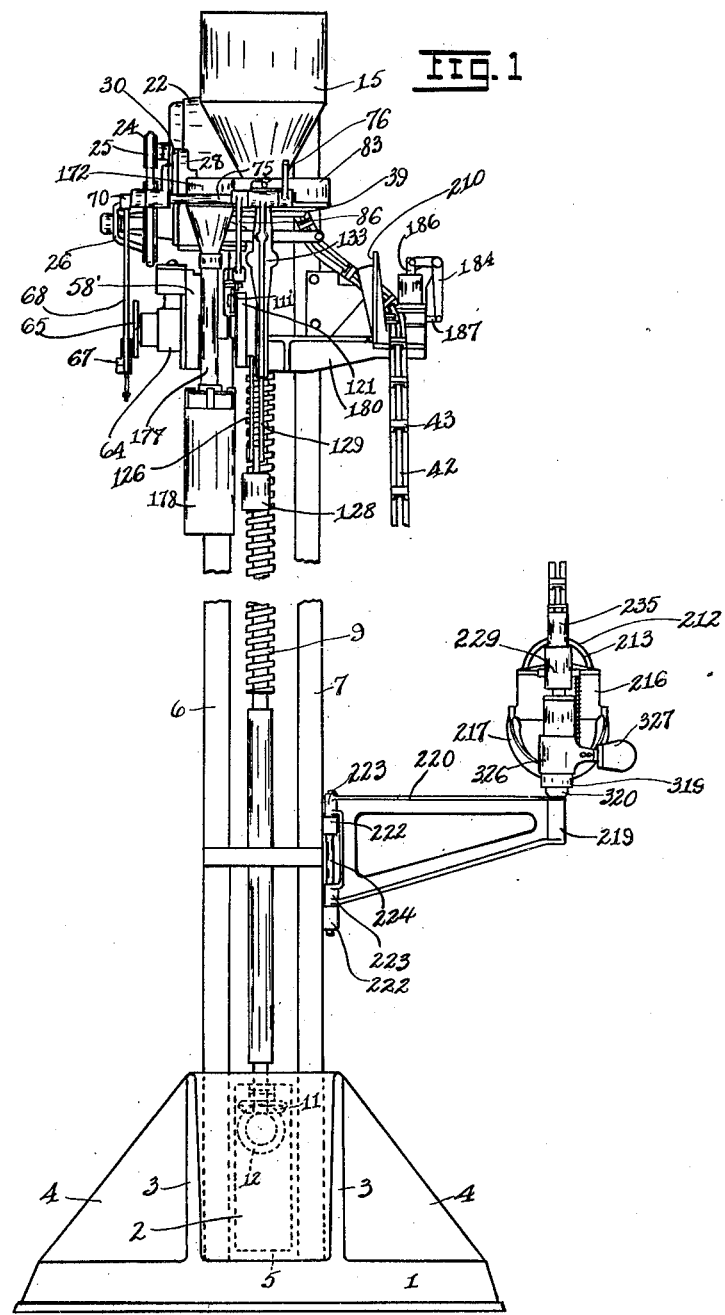
INVENTOR.
H. W. JONES
BY Ira J. Adams
ATTORNEY H. W. JONES.
NUT EQUIPPING MACHINE.
APPLICATION FILED JUNE 21, 1918.
1,369,894.
Patented Mar. 1, 1921.
18 SHEETS—SHEET 2.
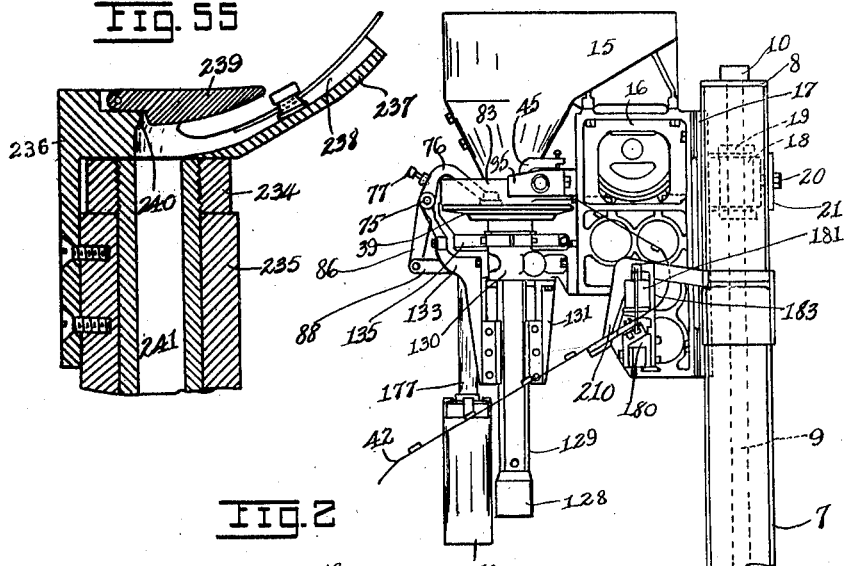
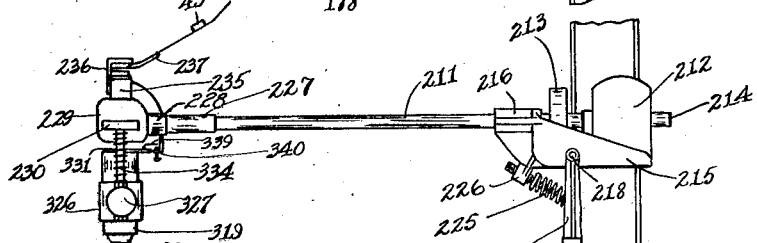
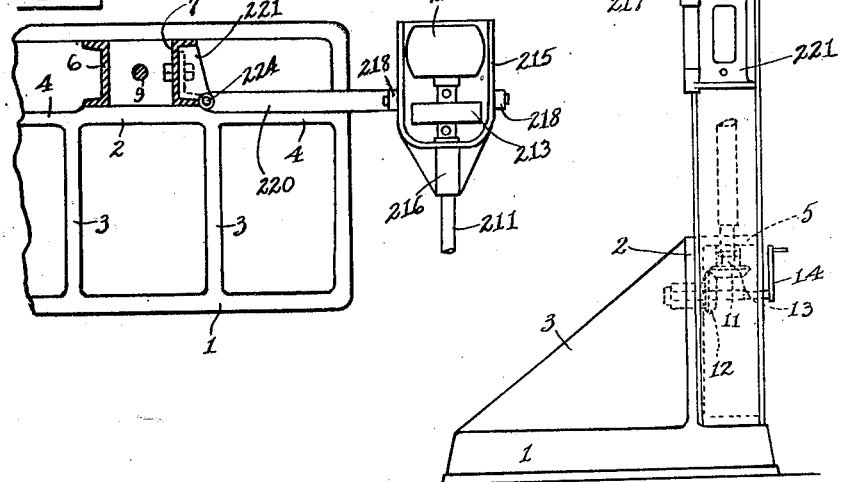
INVENTOR.
H. W. JONES
BY Ira J. Adams
ATTORNEY

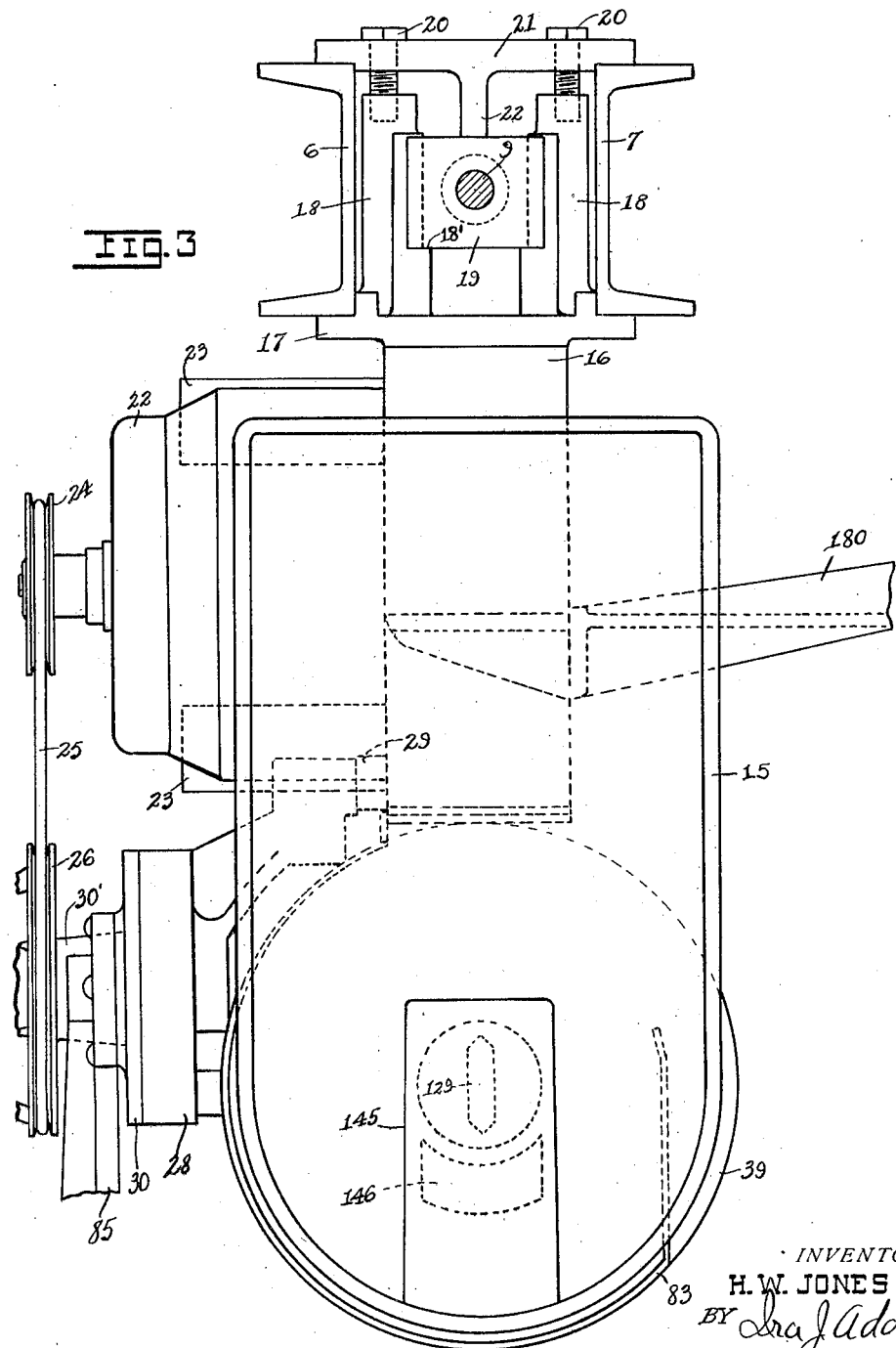

H. W. JONES.
NUT EQUIPPING MACHINE.
APPLICATION FILED JUNE 21, 1918.
1,369,894.
Patented Mar. 1, 1921.
18 SHEETS—SHEET 4.
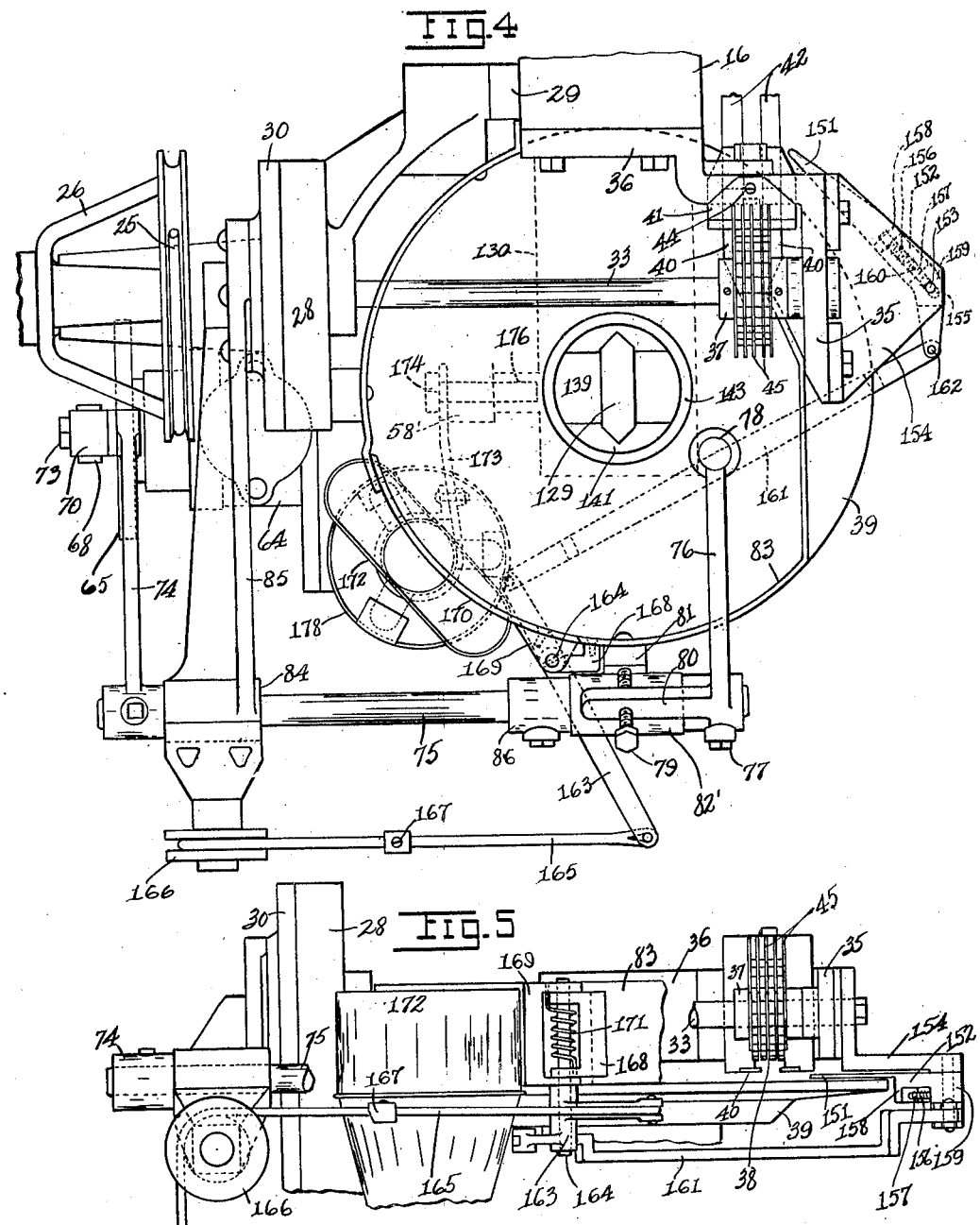
INVENTOR.
H. W. JONES
BY Ira J Adams.
ATTORNEY

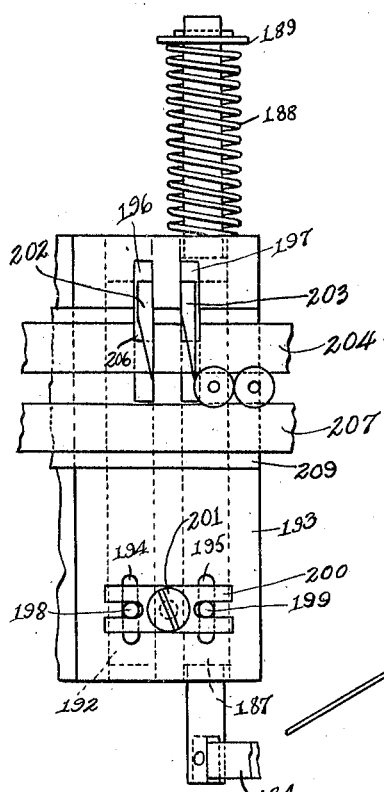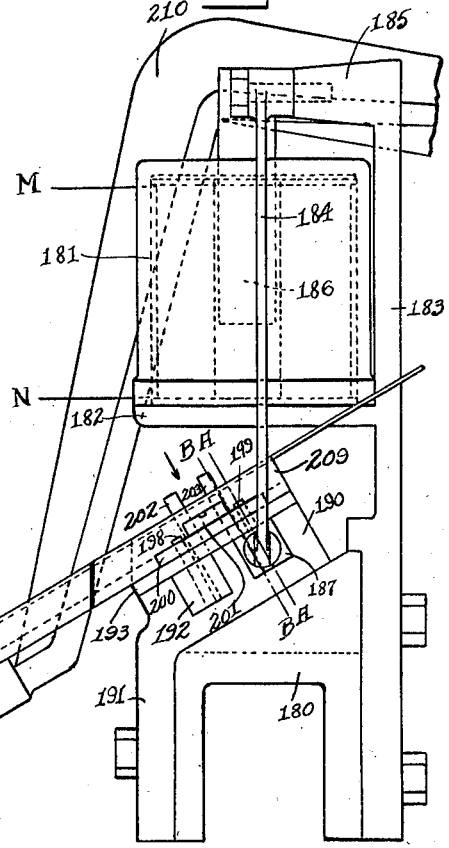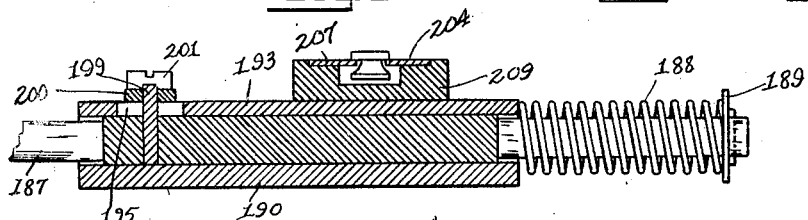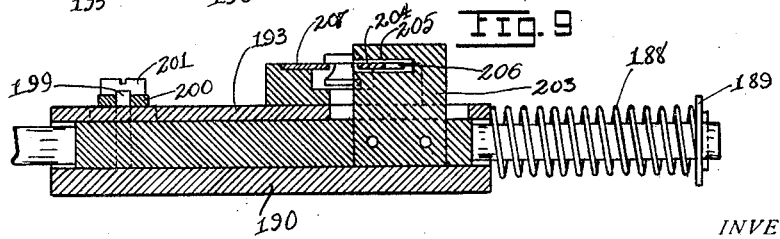

H. W. JONES.
NUT EQUIPPING MACHINE.
APPLICATION FILED JUNE 21, 1918.

1,369,894.

Patented Mar. 1, 1921.
18 SHEETS—SHEET 6.

INVENTOR.
H. W. JONES
BY
ATTORNEY

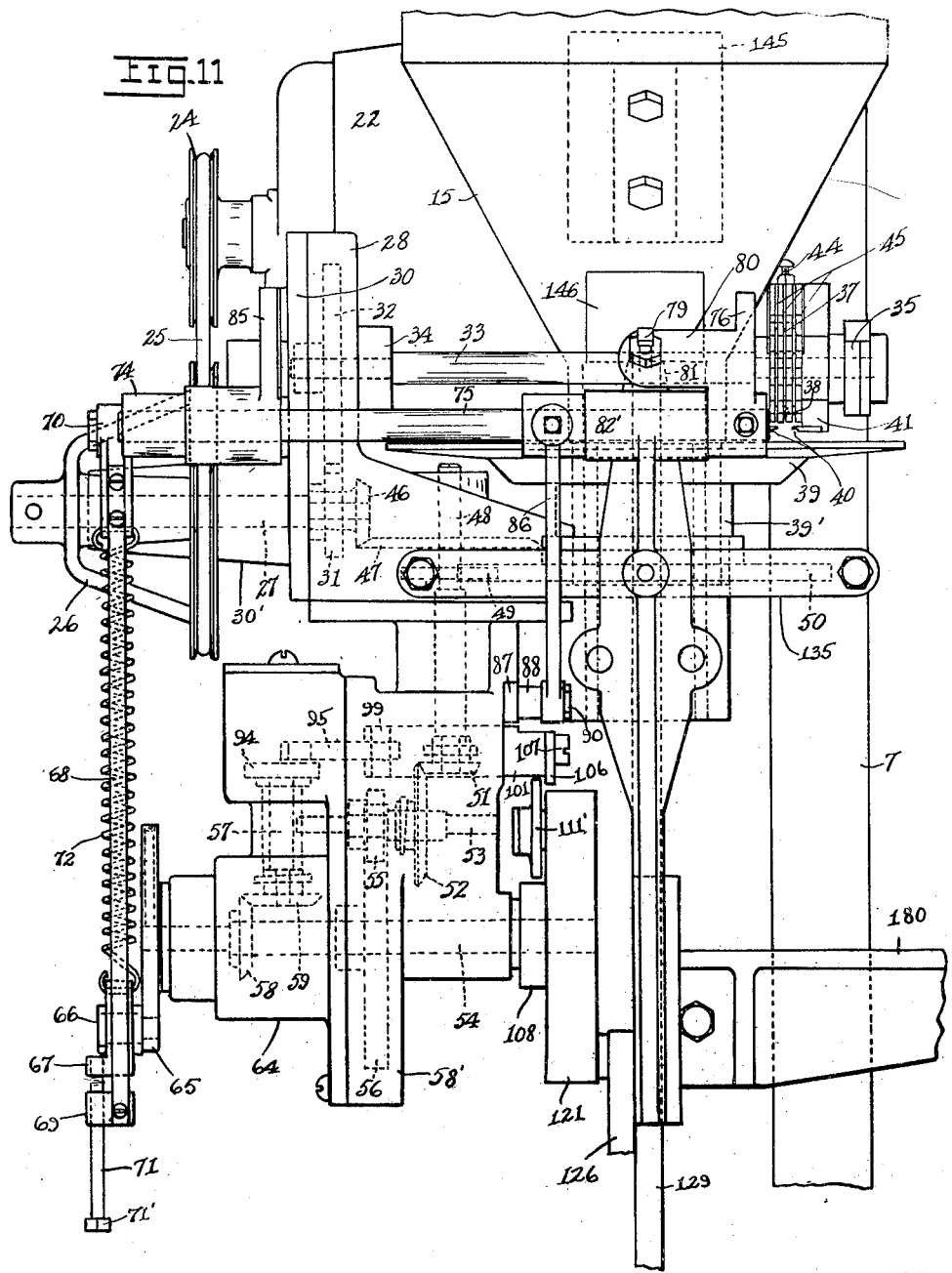

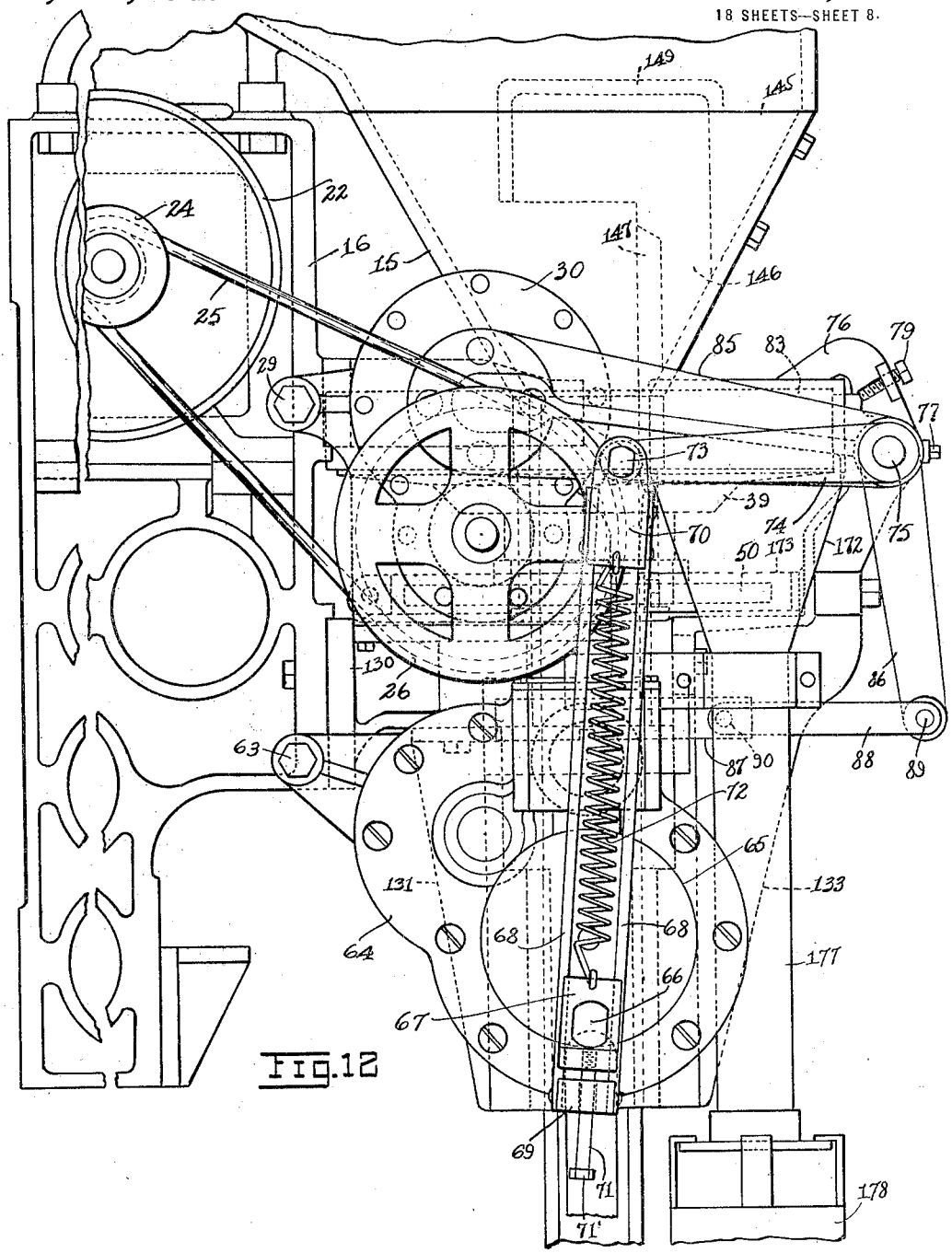

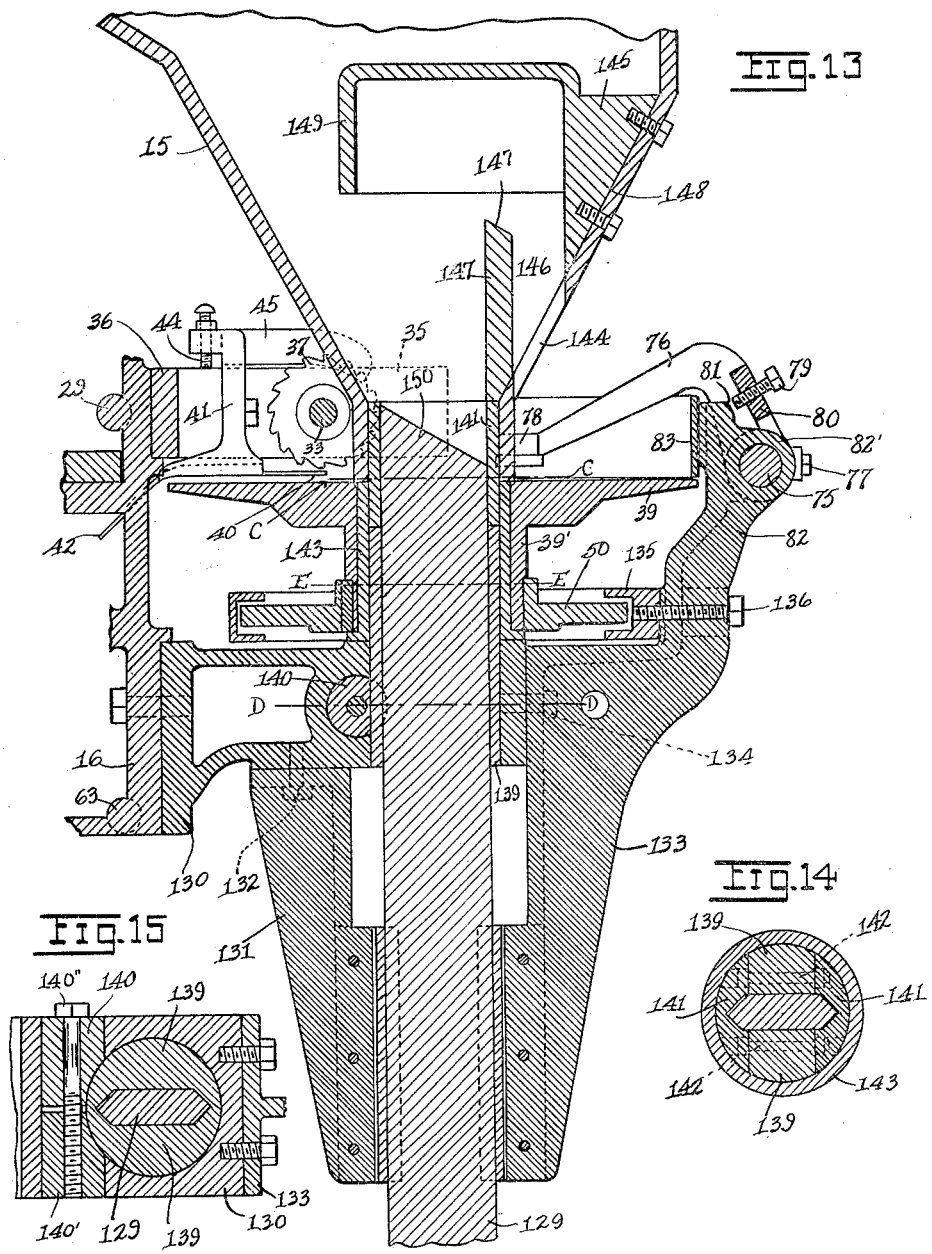

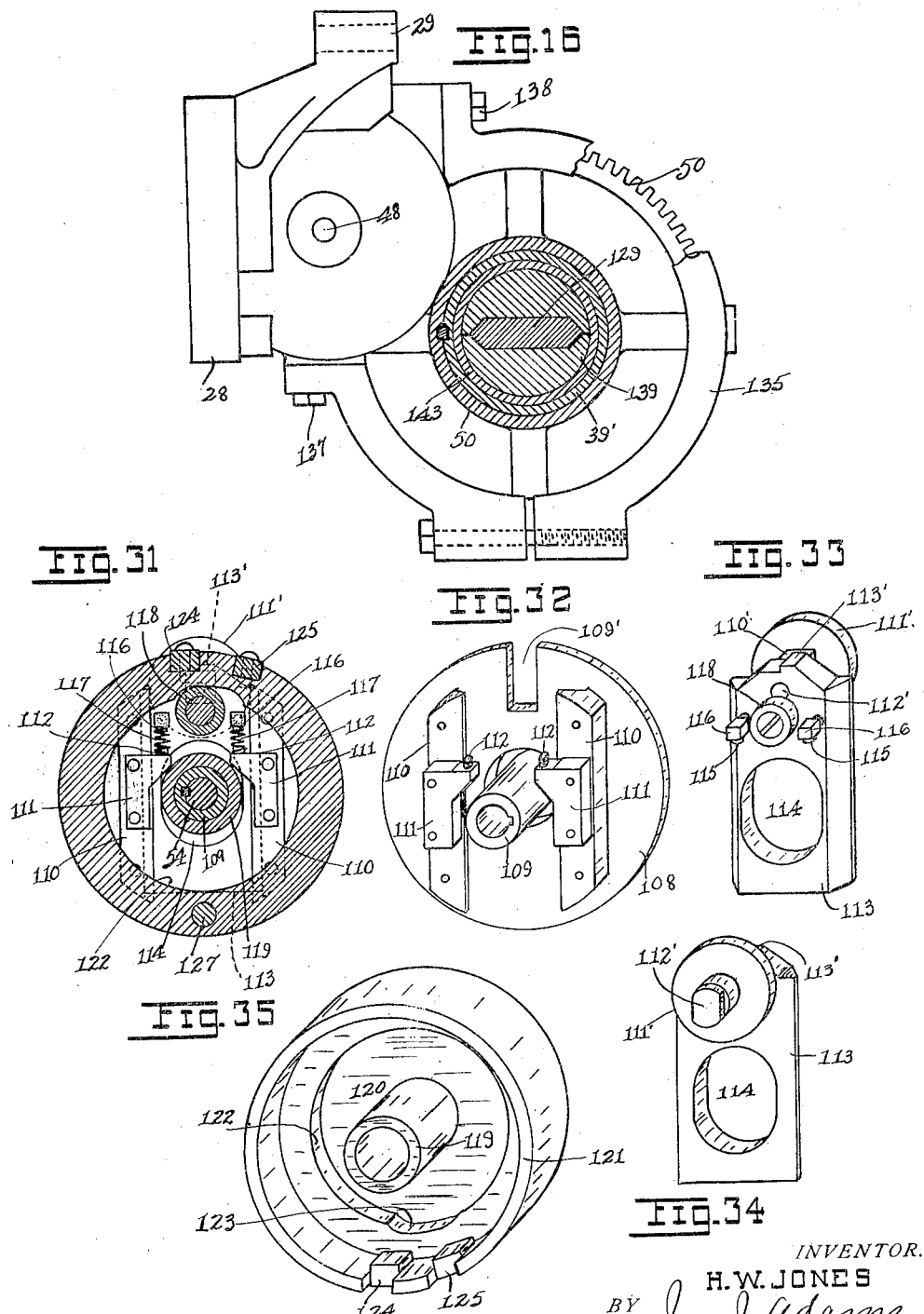

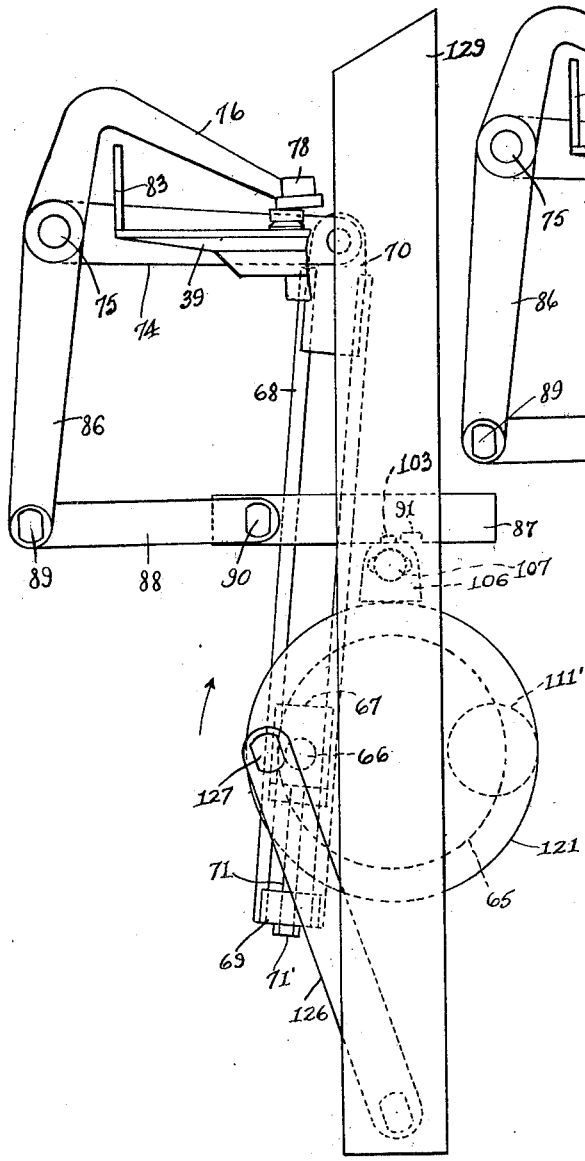
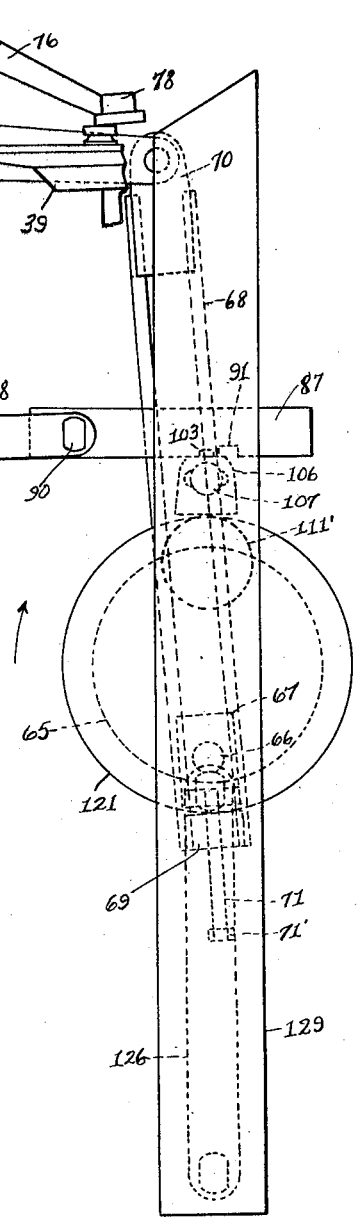

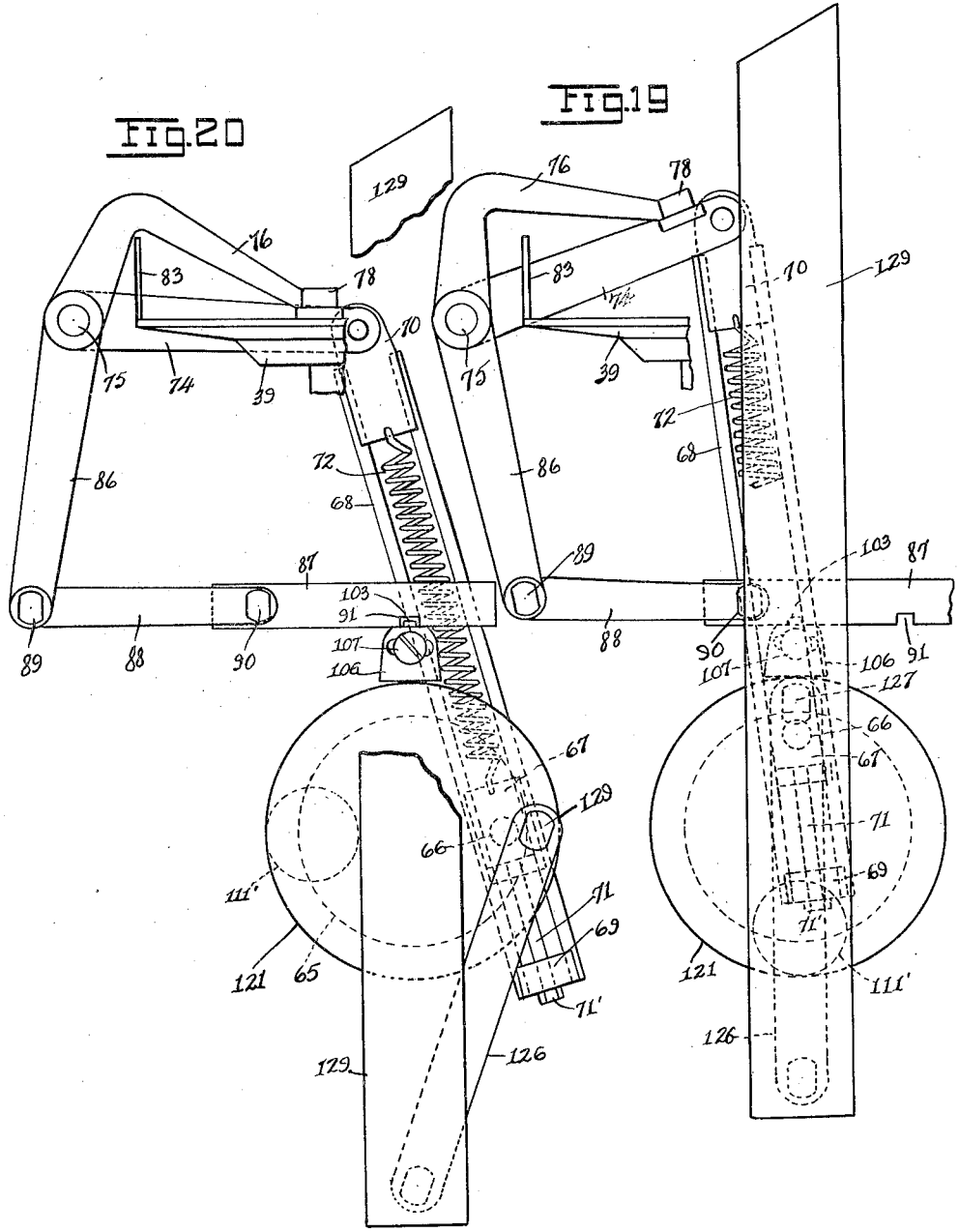

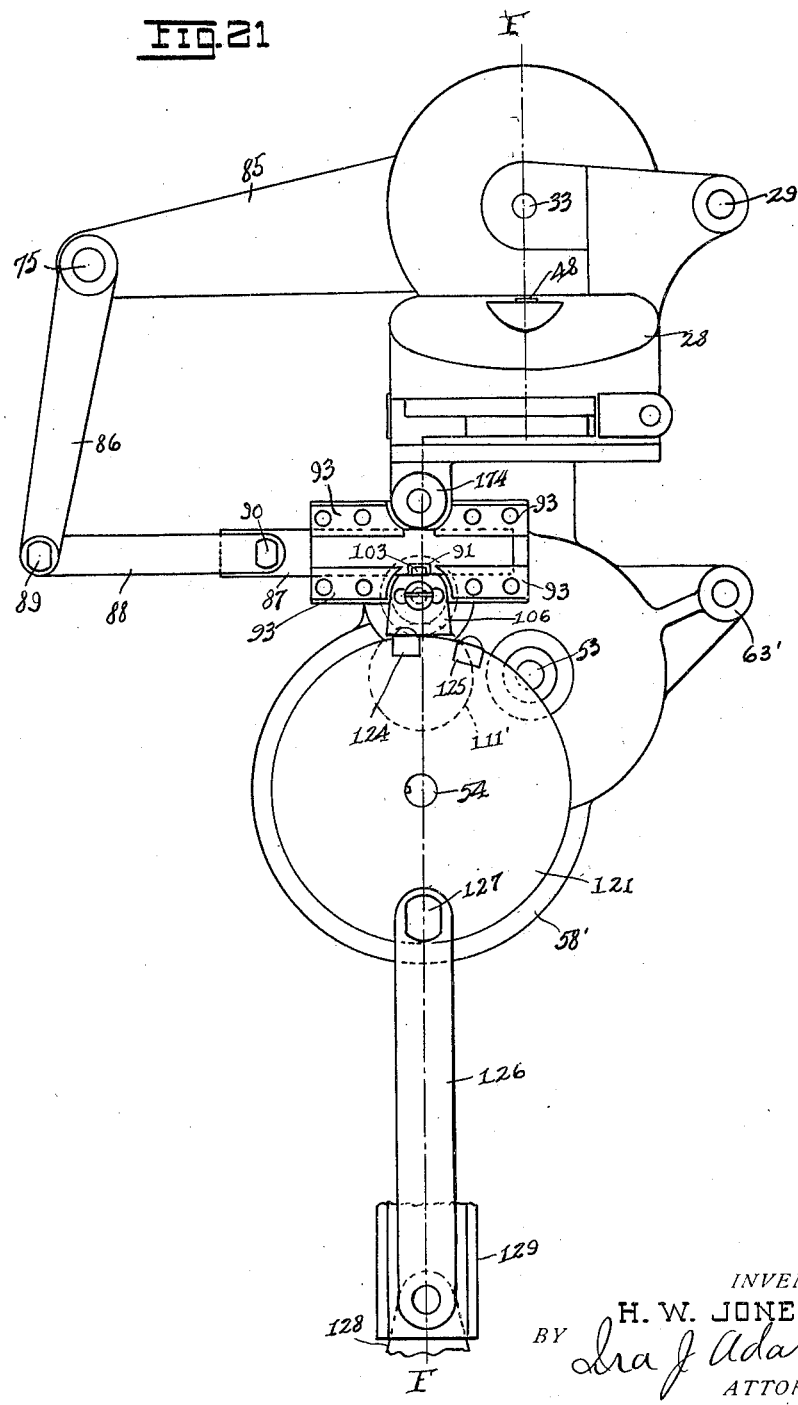

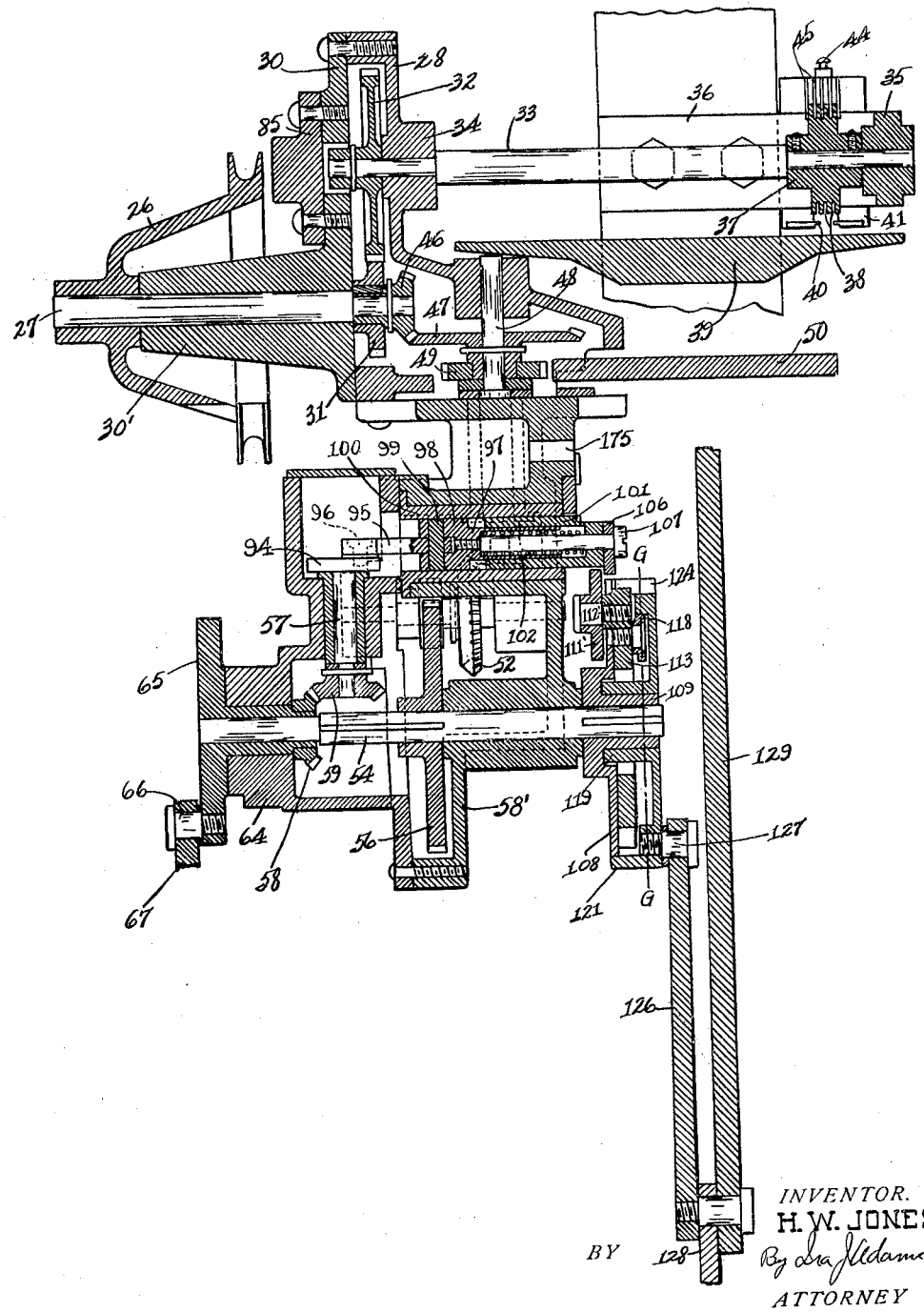

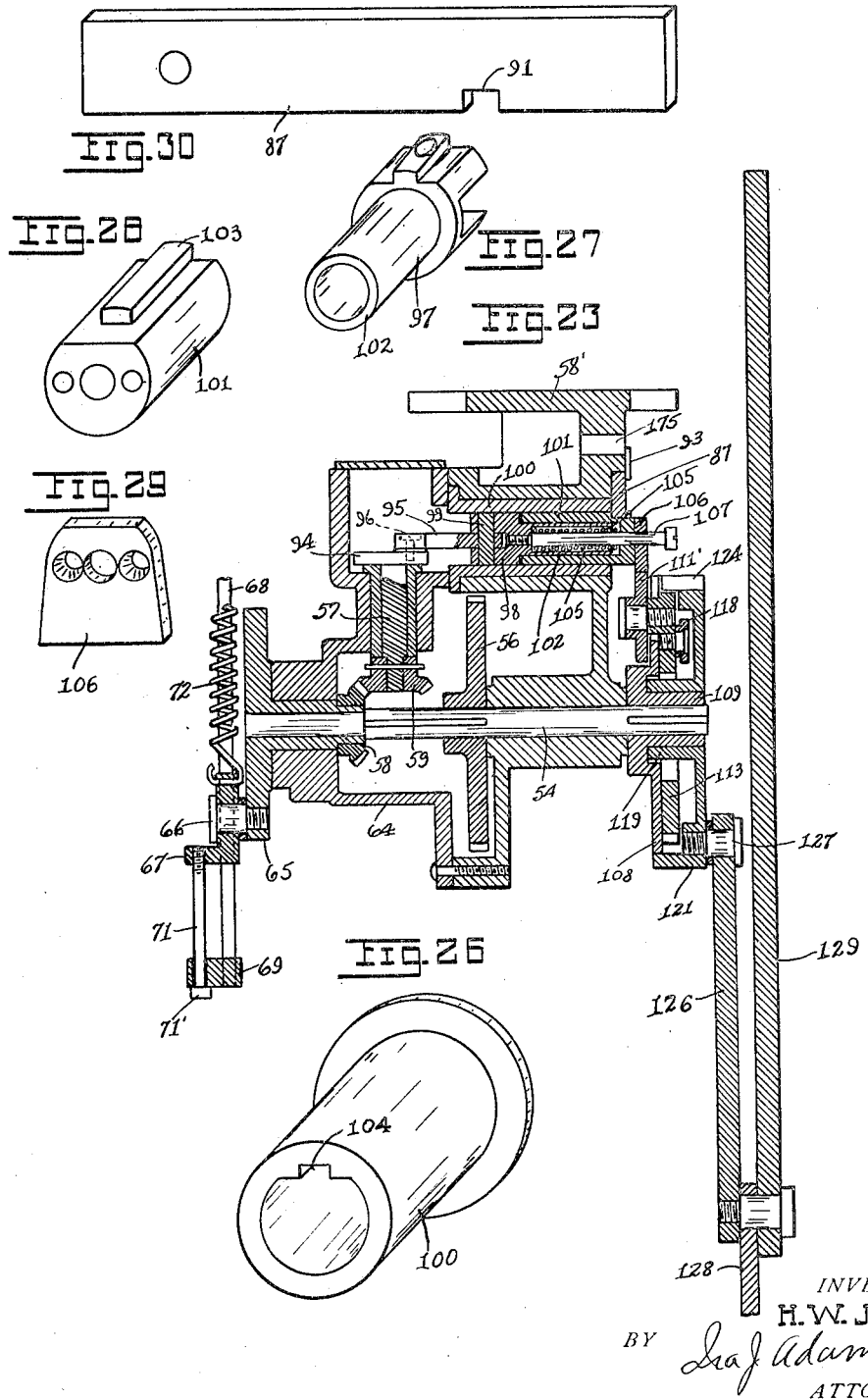

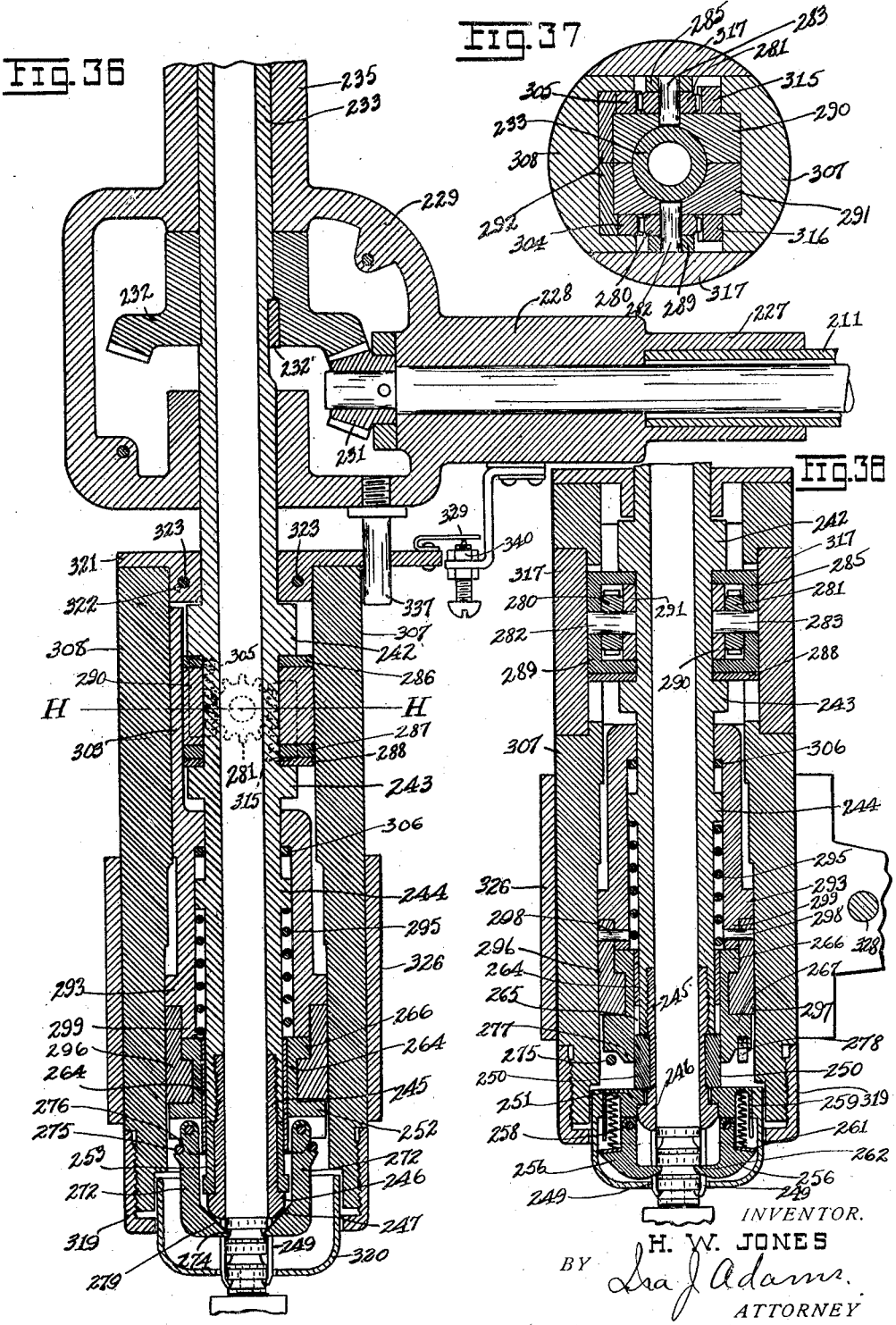

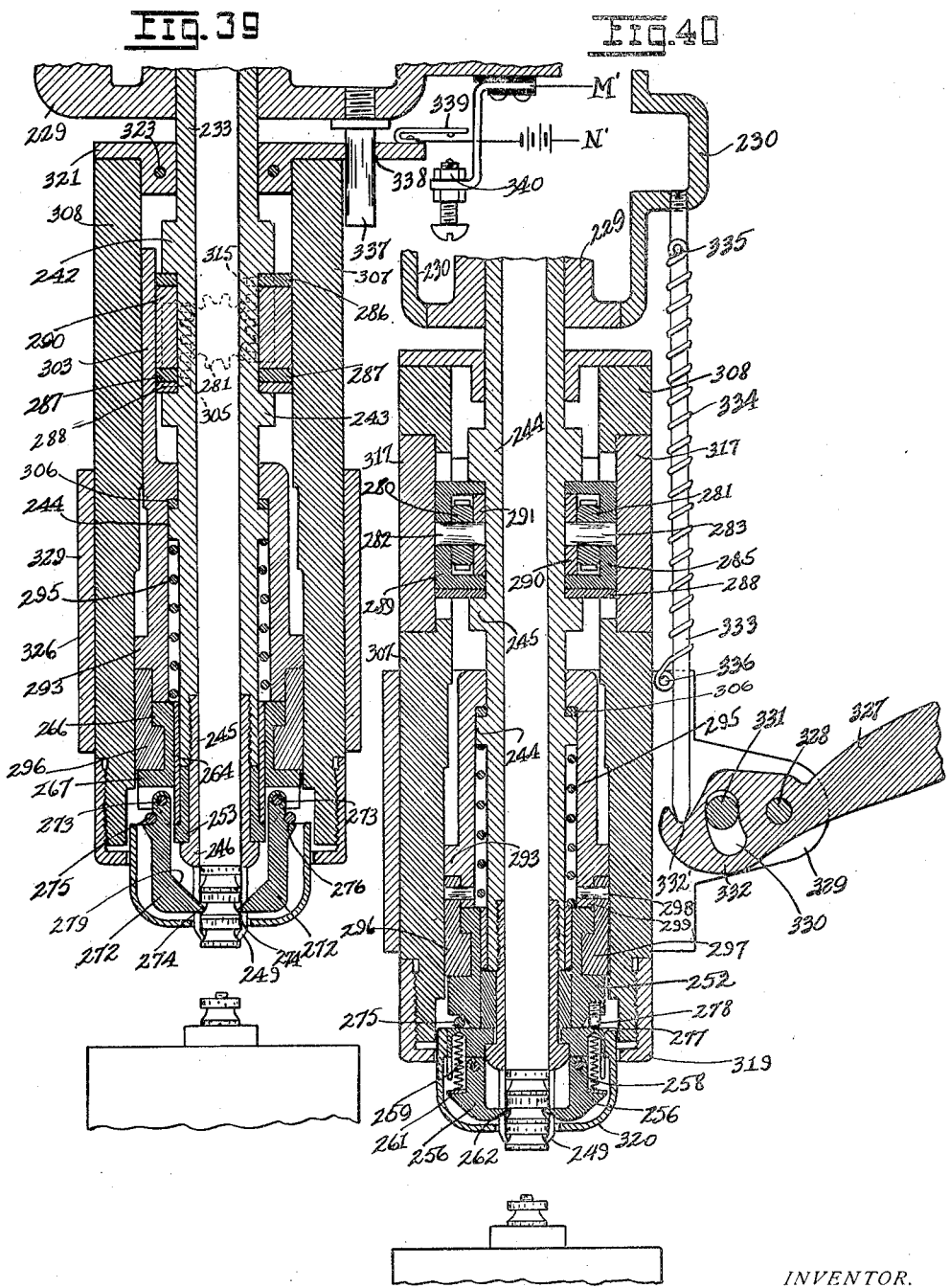

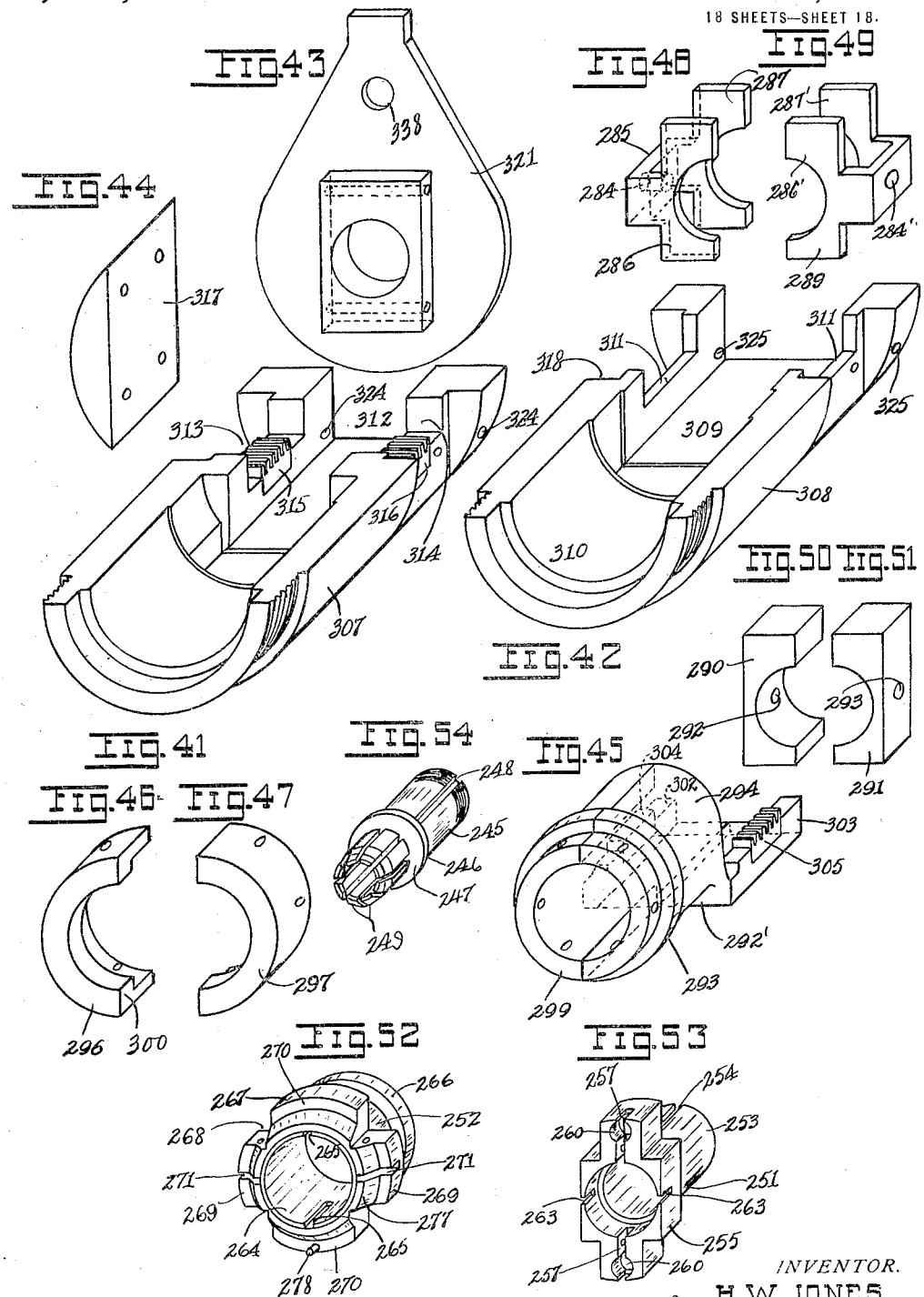

UNITED STATES PATENT OFFICE.

HOMER W. JONES, OF LAKEWOOD, OHIO, ASSIGNOR TO NATIONAL CARBON COMPANY, INC., A CORPORATION OF NEW YORK.

NUT-EQUIPPING MACHINE.

1,369,894. Specification of Letters Patent. Patented Mar. 1, 1921.

Application filed June 21, 1918. Serial No. 241,271.

*To all whom it may concern:*

Be it known that I, HOMER W. JONES, a citizen of the United States, residing at Lakewood, in the county of Cuyahoga and State of Ohio, have invented a certain new and useful Improvement in Nut-Equipping Machines, of which the following is a full, clear, and exact description.

This invention relates to apparatus for applying a nut to a threaded rod. In the accompanying drawings the invention is illustrated in connection with mechanism for applying a well known type of knurled nut to a rod constituting the binding post of a dry cell.

These knurled nuts commonly used for dry batteries are circular and have a groove cut in the peripheral surface at a point closer to one end than the other. The wider portion of the surface is roughened or knurled to provide a gripping surface for the fingers. The narrow portion which may be called the bottom is left smooth and is screwed down to the base of the binding post.

These knurled nuts often are not uniform in the various dimensions and means are therefore provided to eliminate the defective ones so that they will not clog the apparatus, although this feature is required only on account of the non-uniformity of the knurled nuts.

In the dry cell industry the usual practice has been to screw these on by hand. By means of the apparatus embodied in the present invention the knurled nuts are automatically fed to apparatus which screws them onto the post.

With the apparatus described a single operator is able to accomplish the work formerly requiring three or four persons.

In the drawings:

Figure 1 is a front view of the apparatus with certain mechanism omitted to facilitate illustration.

Fig. 2 is a side view having the same mechanism omitted as Fig. 1.

Fig. 3 is a plan view showing a portion of the top with the upper channel connecting plate removed.

Fig. 4 is a plan view with the hopper removed showing particularly the "clear out" mechanism which is omitted in Figs. 1, 2 and 3.

Fig. 5 is a detail of a portion of the front illustrating the mechanism omitted in Fig. 1.

Fig. 6 is a side view of the electrically operated means for releasing the knurled nuts one at a time.

Fig. 7 is a plan view of a portion of the device shown in Fig. 6, taken in the direction of arrow thereon.

Fig. 8 is a section on the line A—A of Fig. 6.

Fig. 9 is a section on the line B—B of Fig. 6.

Fig. 11 is an enlarged view of a portion of the front of the feeding apparatus with the plate guard and clear out mechanism omitted for purpose of illustration.

Fig. 12 is an enlarged side view of a portion of the feeding apparatus taken from the opposite side from that of Fig. 2.

Fig. 13 is a detail view of the knurl feeding arrangement and a portion of the supporting frame in section through the center of the reciprocating knurl feed plunger.

Fig. 14 is a section on the line C—C of Fig. 13.

Fig. 15 is a section on the line D—D of Fig. 14.

Fig. 16 is a detail view partly in section, the parts in section being taken on the line E—E of Fig. 13.

Figs. 17, 18, 19 and 20 are skeleton views showing the feed plunger, the clutch, the feeler and connecting devices in different operative positions.

Fig. 21 is a detail view showing the clutch mechanism and certain gear casings.

Fig. 22 is a section on the broken line F—F of Fig. 21.

Fig. 23 is a cross section on the same line as the lower portion of Fig. 22, showing the clutch operating means in a different position from that shown therein.

Figs. 26 to 30 are cavalier projections of details of the clutch operating mechanism.

Fig. 31 is a cross section of the clutch on the line G—G of Fig. 22.

Figs. 32 to 35 are cavalier projections of details of the clutch.

Fig. 36 is a cross section of the knurl applying means and its driving mechanism.

Fig. 37 is a cross section on the line H—H of Fig. 36.

Fig. 38 is a cross section of the nut applying means, said section being at right angles to the section shown in Fig. 36.

Fig. 39 is a section on the same line as Fig. 36 but with the spinning mechanism in a different operative position.

Fig. 40 is a section perpendicular to that of Fig. 39 and in the same operative position.

Figs. 41 to 54 are cavalier projections of details of the nut applying mechanism.

Fig. 55 is a cross section of the end of the tube where the knurl enters the applying mechanism.

Fig. 57 is a detail showing the bracket for supporting the nut applying mechanism.

Figure 24:
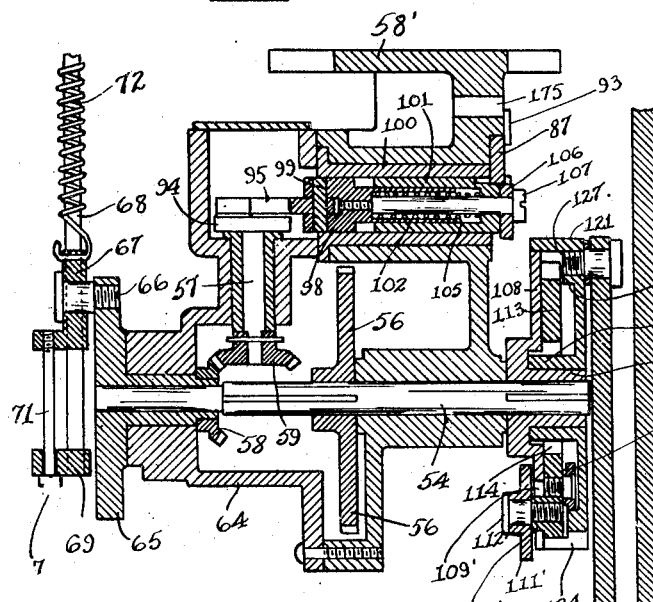
Fig. 24 is a cross section similar to Fig. 23, but with the parts in a position different from Figs. 22 and 23.
Figure 10:
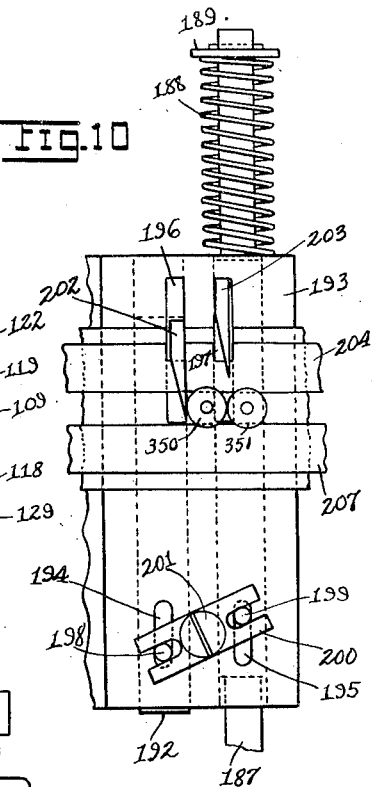
Fig. 10 is a view similar to Fig. 7, but with the parts in a different position.

Referring to the drawings:

The supporting means for the apparatus consists of a base 1 (Figs. 1, 2 and 57) having a vertical projection 2 thereon reinforced by means of ribs 3, 3 and 4, 4. The base is preferably fastened to a foundation in any convenient manner. A hollow box-like casting 5 open at one side is securely fastened to the projection 2, the open side being opposite to the surface adjacent the projection 2, and one end resting on the base 1. Channels 6, 7 are then fastened in a vertical position to the opposite sides of the casting 5 and extend upward a considerable distance forming a supporting framework for the mechanism in a manner which will be described later. The upper ends of the channels are joined by a cross-piece 8 from which a screw threaded shaft 9 is suspended by means of a collar 10. The lower end of the shaft passes through an opening in the upper end of the box 5 and a bevel gear 11 is attached to the shaft which meshes with a bevel gear 12. A stub shaft 13 projects through the box 5 and the bevel gears 11 and 12 therein may be rotated by means of a handle 14 attached to the stub shaft.

For purposes of description the apparatus will be divided into four parts which will be designated the nut feed, the clear-out, the escapement and the applying mechanism, and will be described in that order although the elements all coöperate as a unit. A hopper 15 for receiving a large number of nuts is bolted to the top of a casting 16 which is in turn bolted to a movable carrying member 17. As shown in Fig. 3 the carrying member has two projections 18 located between channels 6 and 7 and fits into grooves in the side of an internally threaded nut 19. The nut coöperates with the screw threaded shaft 9 so that the casting 16 may be raised and lowered by rotating crank 14. To clamp the nut 19 in place, bolts 20 pass through a plate 21 into threaded holes in the projections 18, and a lug 22 abuts against the nut 19 to press it up to the edge 18′. When the casting 16 and the parts fastened thereto are raised or lowered the supporting channels 6 and 7 also serve as guides.

The driving means for the nut feed consists of an electric motor 22 mounted on ledges 23 projecting from one side of the casting 16. A pulley 24 is attached to the motor shaft for driving belt 25 which passes around a second pulley 26 (Figs. 11, 12 and 22) on shaft 27. To carry the shaft 27 a casting 28 which also serves as a gear casing is bolted to supporting member 16 at 29 (Figs. 3 and 12) and is closed by a plate 30 fastened thereto, having a hollow projection 30′ adapted to serve as a bearing for shaft 27. By means of a small gear 31 (Fig. 22) meshing with a large gear 32, a shaft 33 is rotated at a somewhat reduced speed. The end of this shaft passes through the casing 28 which provides one bearing 34 and the other bearing is supplied by an arm 35 of an L-shaped member 36 fastened to the support 16 as shown in Fig. 4. Adjacent this end a kick-out wheel 37 is provided consisting of a ratchet wheel having a wide face and provided preferably with a number of slots 38. A horizontal plate 39 rotated in a manner which will be described more fully later, is spaced from the bottom of the rotating kick-out wheel a distance slightly greater than the thickness of the nut. A pair of fingers 40 project under the kick-out wheel and are spaced apart a distance a little greater than the minimum diameter of the groove in the nut. The fingers are attached to the lower part of a member 41 (Fig. 13) which is bolted to the L-shaped member 36. A part of member 41 between the fingers is slotted out to permit the nuts to pass through onto a track formed of two thin metallic strips 42 which are fastened to the member 41. At various points the strips 42 are connected by means of channels 43 which do not interfere with the passage of nuts. A screw 44 permits the fingers 40 to be adjusted to the desired height.

Occasionally nuts are carried up by the rotating wheel or thrown up in the air so that they would fall behind the wheel and jam or stop the operation. To prevent this a thin blade 45 is fitted in each groove of the kick-out wheel 37 and passes over the wheel where the blade is fastened to support 41.

By means of a small bevel gear 46 on shaft 27 rotation is transmitted to a large gear 47 and a vertical shaft 48 to which it is attached. From this shaft the rotation is stepped down to the rotating plate 39 through gears 49, 50, the latter being keyed to a hollow end portion 39′ having a smaller diameter than the plate. A bevel gear 51 at the bottom of shaft 48 meshes with bevel gear 52 (Fig. 11) and drives a shaft 53.

The rotation is still further stepped down at a lower speed to a shaft 54 by gears 55, 56. From shaft 54 rotation is transmitted to a shaft 57 through bevel gears 58, 59 of the same diameter. All of the gears are inclosed in appropriate casings, the upper casing 28 inclosing the gears 31, 32, 46, 47, 49 and partially surrounding gear 50. A lower gear casing 58' which is shown in cavalier projection in Fig. 25 incloses gears 51, 52, 55, 56 and has suitable passages 60, 61 and 62 through it for the passage of shafts 48, 53 and 54 respectively.

The gear casings 28 and 58' adjoin each other and are bolted together, the lower gear casing having a lug 63' bolted to support 16 at point 63. (Fig. 13.) To close the open end of casing 58' an end member 64 is fastened thereto and is adapted to inclose the gears 58 and 59 and has passages for shafts 54, 57 and 53.

A plate 65 is fitted on the shaft 54 and connected by a pin 66 to a block 67 (Figs. 12 and 24). The block is slidable between guides 68, 68 which are spaced apart at one end by stop block 69 and at the other end by a member 70. A rod 71 having a head 71' passes through a hole in stop 69 and is threaded into the movable slide 67. A tension spring 72 is connected between 67 and 70 and the block 70 is pivoted by means of a pin 73 to a rocker arm 74 on rocker shaft 75. The feeler arm 76 is slipped over the other end of the rocker shaft and fastened thereto by means of a set screw 77. (Fig. 12.) The feeler arm as shown in Fig. 13 is angular in shape so as to clear a guard strip 83 around plate 39. The free end 78 in its lowest position is adapted to come almost into contact with the rotating plate 39. A screw 79 threaded through the projecting lug 80 abuts against the tip 81 of a bracket 82 which will be referred to later. The upper end of the bracket also serves as a bearing 82' for the rocker shaft 75 and the guard strip 83 is bolted against it. The other bearing 84 of shaft 75 is located at the free end of a bracket 85 having its other end bolted to the member 30. (Fig. 4.) Motion of the rocker shaft 75 is transmitted to a third arm 86 (Fig. 18) which is connected to a slide 87 by means of a link 88 pivotally fastened to arm 86 and slide 87 by pins 89, 90. The slide 87, which has a notch 91 cut in its lower surface, fits into a guideway 92 (Fig. 25) cast into the gear casing 58' for this purpose. To hold the slide in the guideway four retaining strips 93 are fastened to the guide as shown in Fig. 21.

The reciprocating movement of the slide 91 imparted thereto by the rocking movement of the shaft 75, coöperates with a reciprocating mechanism which controls a clutch that operates the nut feed. The reciprocating mechanism is operated from a rotating head 94 (Fig. 22) on shaft 57, which is fastened to a link 95 by a pin 96. The link is fastened to the member 97 (Fig. 27) by a pin 99 fitted in a head 98 adapted to slide in the bushing 100 (Fig. 26) which is fitted in a suitable hole 100' in the lower gear casing 58'. Between the bushing 100 and member 97 a hollow casing 101 (Fig. 28) is placed which fits over the hollow reduced end 102 of the member 97. The hollow casing 101 has a projection 103 adapted to fit in a groove 104 of bushing 100 to prevent rotation. A spring 105 (Fig. 23) is fitted in the hollow reduced end 102 and when member 101 is fitted over member 97 the spring is placed under compression which tends to separate the members. At the end of casing 101 a stop 106 (Fig. 29) is fastened. A bolt 107 passes slidably through the stop 106 and casing 101 and fits into a threaded hole in the member 97.

The clutch mechanism which is controlled by the reciprocating mechanism just described, consists of a part shown in Fig. 32 which is keyed on the shaft 54, a part (Fig. 35) of which is adapted to be connected up from time to time with the first part, and an intermediate element (Figs. 33 and 34) adapted to connect the first two parts together. The first part which rotates continuously, consists of a plate 108 with a hollow projecting tube 109 keyed to the shaft 54. A pair of guides 110 are attached to the plate on either side of the shaft engaging tube and on top of each guide a lug 111 is fastened having a pin 112 therein. The guides 110 are adapted to receive a slide 113 having an opening 114 therein for passage of the tube 109. The slide also has a pair of lugs 116 and pins 115 spaced apart the same distance as pins 112, and springs 117 (Fig. 31) under compression are fitted between the pins 112 and 116 as shown in Fig. 31. A roller 118 is attached to the slide between lugs 116 for a purpose to be referred to later.

On the side of slide 113 opposite to the lugs 116 a wheel 111' is fastened by means of a bolt 112' having a square shank 110' adapted to fit into a slot 109' which is parallel to the guides 110 of plate 108. The end of the slide 113 has a lip 113' adapted to engage the stop at certain times as will be set forth in the description of the operation of the apparatus. The outer part of the clutch (Fig. 35) consists of a hub 119 loosely fitted over tube 109, a plate 120 and a rim 121. The bottom of the plate is recessed to provide a circular cam edge 122 having an indentation 123 therein. The wheel 118 is pressed against the cam by the springs 117. The rim also has two slots therein into which are fastened stop blocks 124, 125.

Diagonally opposite the stops 124, 125, a link 126 (Fig. 23) is fastened by screw 127. At the other end of link 126 a weight 128 and a nut feed slide 129 are attached. In Fig. 13 the guides and mechanism surrounding the feed slide 129 are shown in section. The supporting means for these parts consists of a hollow bracket 130 bolted to the frame 16. At the bottom of frame 130 one side 131 of the nut feed slide guide is bolted at 132 and the other guide 133, which is a projection of the member 82, is fastened at 134. A gear casing 135 surrounding gear 50 is also fastened to the bracket by a bolt 136 and the ends of the casing are attached to the gear casing 28 at 137, 138 to completely inclose the large driving gear 50 for the rotating plate 39. (Fig. 16.) A bushing 139 surrounding the slide 129 is held in place by the locking means shown in Fig. 15. This consists of two hollow cylindrical pieces 140, 140' (Figs. 13 and 15) fitted in a hole in support 130, each piece having a corner cut away so that the corners fit the cylindrical surface of the bushing 139. A bolt 140'' passes through the hole in member 140' and the threads engage the hole in member 140' which is threaded to correspond with the bolt. By drawing the two pieces together the bushing is gripped thereby and held securely in place. To the upper ends of the bushing wear plates 141 are attached by fastening bolts 142 (Fig. 14). Another bushing 143 is fitted between the hollow stem 39' of the plate 39 and plates 141, and has a collar resting on the support 130. The bottom of hopper 15 has an opening 144 therein over which a hollow casting 145 is placed. The casting has a vertical passage 146 formed by the upright portion 147, a fastening member 148 which fits the bottom of the hopper and an inverted cup 149 directly over the slide 129. The upper edge 147' of member 147 has a slope the same as that of the inclined top 150 of the slide. At its uppermost position the top edge 150 is in alinement with the edge 147'.

Figure 25:
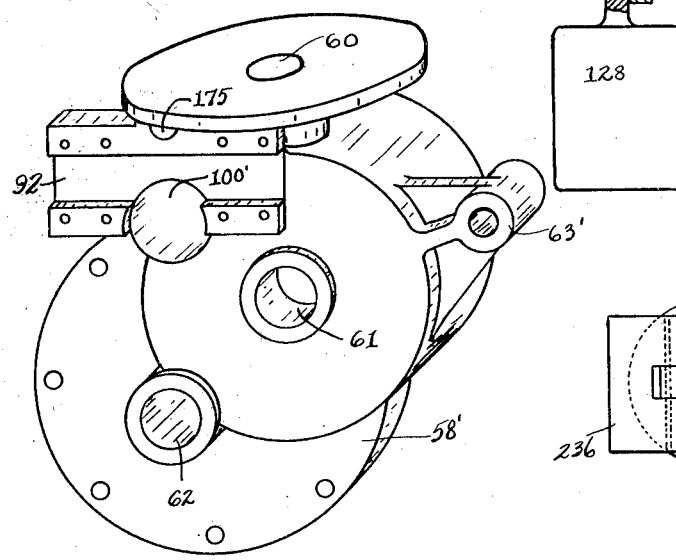
Fig. 25 is a cavalier projection of the gear casing shown in Figs. 23 and 24.
Figure 56:
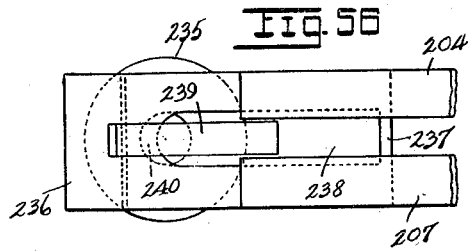
Fig. 56 is a top view of the parts shown in Fig. 55.

The elements described constitute the means for feeding nuts to the inclined track. It is often desirable to remove all the nuts from the plate 39 to clear out a defective nut which has stopped the feeding or clogged the apparatus. This clear-out mechanism is shown in Figs. 4 and 5, and consists of a finger 151 adapted to be slipped under the fingers 40, 40. The finger 151 is connected to a lever 152 rotatable about a pivot 153 projecting from a bracket 154. Occasionally the finger will strike a nut in such a manner that the direction of the thrust is perpendicular to the track and the finger cannot be moved further unless something yields. A small slot 155 is cut in arm 152 to allow the finger to yield enough to pass the nut. This movement is made against the action of a spring 156 which fits around a rod 157. The rod at one end passes through a lug 158 and at the other end passes through a hole in another lug 159 into contact with the pivot 153. The spring is fastened at one end to the rod at 160 and the other end abuts against the lug 158. When the finger yields the spring will return it to its normal position after passing the obstruction. The nut will then be pushed between 42—44 on the return stroke of the finger. To rotate the finger a link mechanism is provided consisting of a link 161 connected to the end of the finger at 162 and to a lever 163 pivoted on a pin 164. The lever 163 is operated by means of a rope 165 passing over a pulley 166. The movement of the rope is limited by a stop 167. Turning the finger 151 clears the track of nuts and it is also necessary to remove all the nuts from the plate 39 which is done by the same movement of rope 165. The pivot rod 164 passes through a spring hinge consisting of a wing 168 fastened to the guard 83, a wing 169 fastened to a movable portion 170 of the guard forming a gate and a spring 171 which normally maintains the gate closed. The wing 169 is keyed or fastened to the pivot rod 164 so that when the lever 163 is turned the gate 170 is opened, thus allowing the nuts to slide off the plate 39 due to centrifugal force. A funnel 172 having an open side is held alongside the gate by a clasp 173 having an end bolted to a lug 176 of the supporting casting 130 by a bolt 174 which passes through a hole 175 in casting 58'. (Figs. 25, 22). The funnel is connected by a tube 177 to a receptacle 178 for receiving the discharged nuts.

The knurl escapement is shown in detail in Figs. 6 to 10. The bracket 180 for supporting this mechanism will be bolted to casting 16 as shown in Figs. 1 and 3. An electromagnet 181 having leads M, N is mounted on a platform 182 projecting from a support 183 which is bolted to bracket 180. A two-armed lever 184 is pivoted to a lug 185 on support 183. At one arm of the lever the core 186 of magnet 181 is pivotally suspended and to the other end a slide 187 is fastened. The withdrawal and return of the plunger is controlled by an electric circuit which is opened and closed by the nut applying means each time a nut is applied, and the slide 187 is simultaneously moved back and forth in its guideway. The return movement of the slide is accomplished by the spring 188 which is fitted between the collar 189 and one end of a grooved guideway 190 having a depending end 191 bolted to the support 180. A second slide 192 is fitted in the grooved guideway and both slides are held in place by a plate 193 having four slots 194, 195, 196, 197 therein. A pin 198 fitted in slide 192 passes through slot 194 and a second pin 199 fitted in slide 187 passes through a corresponding slot 195. The two slides are connected together by a strip 200 slotted at each end to admit pins 198, 199 and pivoted on a screw 201 located between the slots. In this manner the reciprocations of slide 187 are imparted to slide 192 to operate escapement pawls 202, 203 fitted to slides 192 and 187 respectively. Escapement pawl 202 reciprocates in slot 196 and pawl 203 in slot 197. Each pawl also has a slot 205 coöperating with a slot 206 (Fig. 9) which permits the pawls to span one side 204 of the track composed of the strips 204 and 207. The track is fitted in two abutting blocks 208, 209, the latter also having slots in which the escapement pawls move. The distance between the two escapement pawls is approximately equal to the diameter of the nuts. The block 208 is carried by the bracket 210 which is fastened to the channel 7. By turning the handle 14 the nut feed and escapement may be raised or lowered, the track being adapted to be separated at the junction of blocks 208, 209, the former remaining stationary.

The mechanism for applying the nut is mounted on one end of a hollow tube 211 and its weight is partly counterbalanced by a motor 212 and fly wheel 213 fastened on the motor shaft 214. The motor is located on a platform 215 having a bearing block 216 adapted to clamp the tube 211 rigidly. The platform is carried by a fork 217 and pivoted at the arms 218, 218, the fork being rotatably fitted in the free end 219 (Fig. 1) of a bracket 220. The bracket is attached to the channel 7 by means of a plate 221 having lugs 222 which coöperate with lugs 223 of the bracket to permit it to be turned about the pin 224. A spring 225 is arranged between the fork and a projection 226 of the platform to return the nut applying means after it is depressed to apply a nut. The normal position of the parts described is as shown in Fig. 2, the tube 211 being approximately horizontal and the spring 225 slightly under compression.

The tube 211 is fitted in a hollow protuberance 227 having a portion 228 adjoining the casing 229 which serves as a bearing for the extension of the motor shaft. The casing is open at opposite sides, plates 230 (Fig. 40) being bolted thereto to close it after the gears inclosed therein are in position. These include a bevel gear 231 on the motor shaft 214 meshing with a second bevel gear 232 keyed at 232' to a hollow spindle 233 having a passage slightly larger than the diameter of the nuts. To the upper end of the spindle a nut 234 (Fig. 55) is fastened which rests on the projection 235 of the casing 229. Above the nut a guideway is provided to cause the nuts to be dropped from the track into the hollow spindle without tipping. This consists of a casting 236 attached to lug 235 having a grooved end 237 adapted to receive the strips 204, 207 constituting the track. The bottom of groove 238 is spaced from the track a distance just enough to permit the weight of the nuts to be lifted from the strips near their ends. At this point they strike a small lever 239 pivoted in a slot in casting 236 and raise it before striking the inclined edge 240 and dropping into the passage 241. This arrangement very effectively prevents tipping of the nuts at the entrance to the tube which is very troublesome without this device.

The rotating spindle 233 passes through the casing 229 and below the casing is provided with three collars 242, 243 and 244. At the lower end a hollow nut retaining jaw 245 is threaded into the spindle. This retaining jaw has a collar 246 with a curved lower surface 247. The portion above the collar has keyways 248 (Fig. 54) located diagonally opposite each other. The portion below the collar is sufficiently thin to be flexible and is slotted to provide a plurality of flexible strips 249 which are all bent inward so that they form a yielding retaining jaw adapted to grip the nuts and to impart rotation to nuts held therein, but sufficiently yielding to permit them to be readily forced out of the jaw upon application of pressure to the nut.

By means of keys 250 fitted in keyways 248 the small dog holder 251 (Fig. 53), the large dog holder 252 (Fig. 52) and the retaining jaw 245 are caused to rotate with the latter. The small dog holder has a hollow circular end 253 which fits over the end of the retaining jaw member 245 and a pair of slots 254 permit the passage of the keys 250 therethrough. The lower end 255 is adapted to fit upon the collar 246 of the retaining jaw and the dog holder is carried thereby. The small dogs 256 are placed in slots 257 and pivoted on pins 258. By means of springs 259 placed in holes 260 and pressing against the lugs 261, the dogs are normally held in the position shown in Figs. 38 and 40. As illustrated therein the points 262 pass through the slots between the jaws 249 and engage a nut at the grooved portion. At 90 degrees from slots 257 a pair of slots 263 are cut to permit the passage of the large dogs therethrough.

The large dog holder 252 has a bearing 264 driven tightly therein which has keyways 265 for receiving the keys 250. The internal diameter of the bearing is the same as the external diameter of part 253 of the small dog holder and the end of the rotating spindle 233 over which it is fitted. At the ends the dog holder 252 has collars 266, 267, the latter having four notched-out portions 268, thus dividing the collar 267 into four parts 269, 269 and 270, 270. In each of the parts 269, slots 271 are cut to receive the large dogs 272, 272 which are pivoted on pins 273 at one end and the nut engaging points 274 of the dogs are pressed toward each other through the slots between jaws 249, by a circular spring 275 consisting of a single turn fitted in notches 276 in the dogs and around a reduced end 277 of the collar 267. The ends of the spring are held apart by a pin 278 screwed into one of the sections 270 of the collar 267. The nut engaging point 274 has an inclined upper edge 279 which slides on 247 and forces the dogs 272 to be slipped out of engagement with the nuts when the dog holder moves upward.

The parts described comprise all of the parts rotating with the spindle and the remaining parts are fitted around the spindle 233. Between collars 242 and 243 a pair of gears 280, 281 are mounted on pins 282, 283. One bearing of pin 283 is provided by a hole 284 in the frame 285 (Fig. 48) which has two spindle engaging members 286, 287 spaced apart a distance a little less than that between the collars 242, 243. The remaining space is occupied by a split washer 288 placed below member 287. The frame 289 (Fig. 49) is similar to frame 285 and has corresponding parts 284', 286' and 287' which are, however, placed right for left. A second pair of blocks 290, 291 (Figs. 50 and 51) adapted to fit around the spindle 233 and between members 286, 287, have holes 292, 293 acting as bearings for pins 283, 282. Between the frame 285 and block 290 when assembled, space will remain for gear 281 and similarly between frame 289 and block 291 is a place for gear 280.

A slide 292' (Fig. 45) split so that it may be fitted over the spindle, has a collar 293 on a hollow cylindrical portion 294 which surrounds the spindle 233 but is spaced therefrom a distance sufficient to accommodate a spring 295 abutting against collar 244 and the large dog holder 252. The slide will be connected with the large dog holder by means of the split coupling members 296, 297 which also act as a thrust bearing. Pins 298 connect the coupling members to the end 299 of the slide and the ledge 300 of the coupling fits in the space between the collars 266 and 267 of the large dog holder. Longitudinal motion of the large dog holder 252 and slide 292 are the same, but the slide does not rotate with the dog holder. The slide has a flat end 301 grooved in the center to leave two upstanding edges 302, 303 adapted to receive racks 304, 305 respectively. When the cylindrical part 294 of the slide is fitted around the spindle, rack 304 engages gear 280 and rack 305 engages gear 281. As shown in Figs. 39 and 40, the collar 244 abuts against a washer 306 at one end of the stroke.

The slide is inclosed in a split casing made of the two members 307, 308 (Figs. 41 and 42). The member 308 has a rectangular groove 309 which serves as a guide for the flat end 301 of the slide and a semicircular surface 310 of the same diameter as collar 293 which slides therein. A pair of slots 311 are cut in the vertical sides of the casing member 308 to provide space for the gears 280 and 281 and frames 285 and 289. The other side 307 of the casing has an oblong groove 312 shaped differently from groove 309 and is wide enough to receive the assembled blocks 290, 291 for which the groove serves as a guide as shown in Fig. 37. Slots 313, 314 are also provided in the edges of the casing for the gears 280 and 281, and the frames 285 and 289. In slots 313 a rack 315 is placed which engages gear 281 at a point opposite to that at which rack 305 engages this gear. Similarly a rack 316 in slot 314 engages the gear 280 which is in engagement with rack 304. The two halves of the casing are held together by means of two sectors 317 which are attached by screws in suitable recesses 318 of the casing. The lower end of the split casing is held together by a collar 319 threaded onto the end. A cap 320 fastened to member 251 incloses the dogs and rotates therewith, and has an opening for the nuts. At the upper end the casing is closed by a plate 321 having a rectangular raised portion 322 which fits in the combined parts of the casing, and is held therein by bolts 323 passing through the part 322 and holes 324, 325 in the casings 307 and 308 respectively. Around the combined cylindrical casing 307, 308 a clamp 326 is placed having a handle 327 pivoted on a pin 328 fitted between the lugs 329 of the clamp. The handle has a curved slot 330 for receiving a stop pin 331 and a projecting end 332 has an indentation 332' therein adapted to engage a rod 333 screwed into the side plate 230 of the gear casing 229. A spring 334 is connected under tension between a pin 335 on rod 333 and a pin 336 on the clamp. When the handle is pressed down the split casing is moved down relatively to the gear casing 229. A guide pin 337 is threaded into the gear casing and passes through a hole 338 in the plate 321. The relative movement of nut applying mechanism to the drive gear casing is adapted to open or close an electric circuit M', N' connected to M, N by separating or contacting the spring bolt 339 attached to plate 321 and a contact 340 attached to the gear casing but insulated therefrom.

The operation of the apparatus is as follows:—A considerable quantity of knurls are placed in the hopper 15 which is preferably maintained filled at least to the level of the bottom of the inverted cup 149. When the motor 22 is started the plate 39 will be set in rotation through the pulley 24, belt 25 and pulley 26 which sets in motion the train of gears 46, 47, 49 and 50, the latter being rotatably connected with the plate 39. By this driving means the number of revolutions of plate 39 is decreased to a few. Simultaneously the kick-out wheel 37 is set in rotation by means of the same pulleys and belt and the gears 31, 32 which reduces the speed somewhat, but the rotation of the kick-out wheel is rapid compared with that of the plate 39. The feeler 76 is raised and lowered, the precession being gears 46, 47, 51, 52, 55, 56, which produces a rotation of plate 65 of about half the speed of plate 39. This rotation is translated into a reciprocating movement of block 67 in guides 68, 68, and this is transmitted through the spring 72 and member 70 and arm 74 to rock the shaft 75 back and forth in the following manner. When the block 67 is passing into the uppermost position as shown in Fig. 19, the arm 74 is raised because the head 71' of the pin 71 engages block 69 and carries the guides 68, 68 and block 70 upward with the block 67. The tension on spring 72 is relaxed during this movement. As the pin 66 is rotated toward the right for the next 90 degrees, the arm 74 and feeler arm 76 are drawn downward until the feeler strikes the plate 39 as shown in Fig. 20, if no nut is in the way. The head 71' of rod 71 is held against abutment 69 by the tension produced in spring 72 and the movement of lever 74 turns shaft 75 through a certain angle. The lever 86 is turned through the same angle and link 88 and slide 87 are thus moved far enough to cause the slot 91 to assume the position shown in Fig. 20 in which it coincides with the ridge 103 of casing 101. If the feeler end 78 should strike a nut on the plate 39, the lever 74 and shaft 75 would be turned through a smaller angle and feeler 76, levers 74 and 86, line 88 and slide 91 would move through a smaller distance so that notch 91 does not coincide with ridge 103. The position of these elements is the same as that shown in Fig. 17 in which pin 66 and block 67 have rotated through another 90 degrees to the lowest position of pin 66. The arm 74, shaft 75, lever 86 and slide 87 are stationary during this period, while the block 67 moves down in the guides 68, placing additional tension on the springs 72. As will be seen from this figure, the notch 91 does not coincide with the ridge 103 when the feeler 78 touches a nut (when it moves toward the plates). During the rotation through the third quarter as well as the preceding quarter, the feeler 76, lever 74, lever 86, link 88 and slide 87 remain in the position shown in Figs. 17 and 20, depending on whether the feeler touches a nut or not. The block 67 approaches the abutment 69 during these two periods, the head 71' of pin 71 moving down out of engagement with the abutment 69. When the third quarter of the rotation is completed the head 71' again engages the abutment 69 (Fig. 18) and during the fourth quarter the feeler is raised until it assumes the position shown in Fig. 19.

The movement of the notch 91 into the position shown in Fig. 20 produces a feeding of nuts by coöperating with a clutch which picks up the nut feed slide and when slot 91 assumes the position shown in Fig. 17 the clutch does not pick up the nut feed slide. This coöperation is secured in the following way:—

The reciprocating movement of the ridged member 101 is produced from the same shaft 54 as the plate 65 through miter gears 58, 59 which move the crank 95 and rotate the connecting pin 96 through the same number of revolutions as the pin 66. When the feeler 76 is raised as shown in Fig. 19, the link 95 and end piece 106 of the ridged member 101 are moved back as shown in Fig. 24, and the slide 87 rests on the flat part 101' of member 101. (Fig. 28.) If the feeler 76 strikes a nut on its downward stroke (Fig. 17) the notch 91 in slide 87 does not correspond with the ridge 103 of the member 101 and the end of the ridge 103 strikes the slide 87 as shown in Fig. 23. The spring 105 takes up the balance of the stroke of the member 97 and is thus compressed. The enlarged end of member 97 almost touches the end of member 101 in this case. The attached lug 106 is thus held in position to engage the roller 111' when it comes into its uppermost position as in Fig. 23. By such engagement the slide 113 is pushed downward in the guides 110 against the action of springs 117 and the roller 118 is not permitted to ride into the indentation 123, but is pressed down so that the ledge 113' does not strike the stop 124. The square shank 110' slides in the slot 109' when the rollers 118 and 111' are thus depressed. If the projection 113' is held out of engagement with the stop 124 the stationary outer casing 120 will not be rotatably connected with the rotating plate 108 and the nut feed slide 129 remains stationary.

If, however, the feeler touches the plate as in Fig. 20, then the ridge 103 and slot 91 coincide and the member 101 and attached roller engaging member 106 are permitted to make the full stroke (Fig. 22) and when the roller 111' is at its uppermost position the member 106 has moved beyond it so that the two do not come into engagement. The roller 118 then rides in the indentation 123 and the slide 113 is raised by the springs 117 so that the projecting end 113' strikes the stop 124 and is held between this and stop 125. When the lug 113′ abuts against the stop 124 then the member 120 and pin 127 are rotated through one revolution and the slide 129 and link 126 are raised and lowered. As the slide 129 passes through the nuts in the hopper 15, a number of these are raised and deposited in the passage 146 and drop on the rotating plate 39 and are rotated in a jumbled fashion thereon.

After one revolution the clutch will release the member 120 if the feeler 78 touches a nut and the slide will remain stationary until the nuts on the rotating plate are depleted to such an extent that the feeler touches the plate 39 instead of a nut. In this manner from time to time nuts are dropped onto the plate, keeping the quantity of nuts on the plate from being too much or too little.

As the plate rotates the nuts are carried in between the fingers 40, 40. If they enter with the flat ends between the fingers, then, as the nuts have a diameter which is greater than the distance between the plate and kick-out wheel, the nut will be knocked out by the rapidly rotating kick-out wheel 37. This wheel rotates in a direction which forces the nuts out of the fingers if it engages them while the rotation of the plate moves them in. Even if the diameter were smaller than the distance between the plate 39 and kick-out wheel, the nuts would not be held by the track if they entered between the fingers in this position. Only nuts which enter upside down are allowed to remain on the track, that is, the narrow edge of the nuts must be uppermost. If the wide edge is uppermost and the fingers engage the groove with the nut in this position, then the top of the nuts projects up high enough to touch the kick-out wheel and is knocked by this wheel.

If the fingers become clogged on account of non-uniformity or defective nuts, the operator will remove or "'clear out" all the nuts on the plate by pulling on the rope 165. This will open the gateway 170 and the nuts will be scraped off by the gate and by centrifugal action. Any nuts under the fingers 40, 40 will be removed by the clearout finger 151 which slides under the track fingers. All these are deposited in the funnel 172 and poured into the receptacle 178. These may be used in manual operations or may be run through the apparatus to sort them.

The nuts fed between the fingers are forced into the track and slide down this until they reach the escapement. When the hopper is first filled and the rotating plate contains no nuts, then the feeler 78 will of course touch the plate more often and the slide will operate more frequently until the plate is party covered with nuts. After the clearout is utilized the nut feed slide also operates more frequently than during normal operation.

The nuts on the track are released one at a time by the operation of the electromagnetic escapement controlled by the nut applying means. The nut applying means operates in the following manner:—The spindle 233 is continuously rotated quite rapidly by means of the gears 231, 232, unless the operator shuts off the motor 212. The two pairs of dogs 256, 256 and 272, 272, the dog holders 251 and 212, and the nut retaining jaws 249 are connected by key 250 to rotate with the spindle 233. The large dog holder 252 and dogs 272 are also slidable back and forth in the casing together with the surrounding elements 292′, 296, 297 to which they are connected. The small dog holder 251 and jaws 249 move up and down with the spindle 233, the movement of which coincides with that of the main gear casing 229.

To apply a nut to a threaded post the operator grasps the handle 327 and presses down, thus moving the parts from the position of Fig. 39. This raises the notched point 332′ relatively to the casing 307, 308, and lengthens spring 334, but the mechanism as a whole is also moved downward by pressing the handle to compress the spring 225. The gears 280, 281, on account of being mounted between the collars 242, 243, have a longitudinal movement the same as the spindle 233 and gear casing 229, or in other words, the movement of the mechanism as a whole. The split casing 307, 308 and the racks 315, 316 therein accordingly have simultaneously imparted thereto an additional downward movement equal to the distance moved by the point about the pivot 328.

When the handle is first depressed the nut engages the binding post of the dry cell, and during this downward movement of the split casing 307, 308, the racks 315, 316 attached thereto rotate the gears 280, 281 and the rotation imparted to these gears is transmitted to the racks 304, 305 of the slide 292′ to produce an opposite movement of the slide and the parts connected thereto. That is, the large dog holder 252 and large dogs 272, 272 are connected to the slide and move upward relatively to the rotating jaws 249 and spindle 233. The inclined surface 279 engages the second nut and the dogs 272 are turned about pin 273 until out of engagement with the groove of the nut, and then move upward until surface 247 opens dogs 272 clear of the column of nuts, completing the upward movement of the large dogs, the small dogs 256 and jaws 249 holding the column of nuts up in the meantime. The small dogs 256 do not move relative to the end of the jaws 249, but remain in the groove of the second nut on the down stroke of the handle. On this stroke the spring 295 is compressed between the collar 244 of the spindle 233 and the top of the large dog holder. As soon as the nut which is held in the jaws 249 and rotated therewith, touches the post, it is swiftly screwed thereon (Fig. 36), this requiring only an instant.

When the operator releases the pressure on the handle 327 to produce the up-stroke, the mechanism as a whole is raised by the spring 225. This exerts enough upward pull to draw the nut (shown in Figs. 36 and 38) out of the flexible jaws 249. On the upward movement of the apparatus as a whole the large dog holder 252 and slide 292' are moved downward relatively to the spindle by the spring 295 which was compressed on the downward movement of the handle. On this stroke the large dogs 272 which were moved up above the groove of the third nut on the previous down-stroke of the handle, move relatively downward and points 274 enter the groove of the nut carrying it therewith, and the movement is transmitted to the nut just below engaged by the small dogs. This nut is then also moved downward and causes the small dogs 256 to be turned out of engagement with the groove so that the nut held by the small dogs is pushed down to replace the nut removed from the jaws 249. When this is accomplished the small dog again slips into the groove of the next nut.

On the down-stroke of the handle 327 the points 339, 340 come into contact to close the circuit MN through the battery and draw the core 186 into the solenoid against the action of the spring 188. This releases nut 350 by drawing the pawl 203 forward in between the nuts 350 and 351 (Fig. 10) and the pawl 202 backward out of engagement with the nut 350. The nut thus released slides by force of gravity down the track between the strips 204, 207 which fit in the groove of the nut until it reaches the lever 239 and inclined edge 240. These prevent it from turning over and allow it to drop into the spindle. When the circuit is opened by releasing the handle 327, the spring 189 raises the core 186 and again places the fingers in the position shown in Fig. 10. As shown in Fig. 7 the nuts are held back by finger 203 until finger 202 is in position to catch them. Although the nuts are fed to the track upside down, the track makes a turn between the feeder and the escapement to place them right side up and they are dropped into the spindle 233 in this position.

To secure stability of that part of the apparatus which applies the knurls to the threaded members designed to receive them, it is advisable that this portion of the apparatus be placed as close to the supporting floor as possible. In order to secure a gravity feed of the knurls to this portion of the machine, it is necessary that the hopper 15 and other portions of the feeding mechanism be placed at a considerable height above the floor. When adjustments or repairs are necessary, it is very inconvenient to make them when these parts are located at their normal elevation and the screw feed 9 is, therefore, provided, in order that the hopper and feeding mechanism may be lowered when desired for inspection and repair.

It is preferable to place a number of nuts in the spindle to commence with, and inasmuch as a nut is released by the escapement each time one is applied to a post, this supply will be constant in the tube. Under ordinary conditions the plate 39 feeds enough nuts to the track to keep the escapement plentifully supplied.

While this invention has been illustrated in connection with a certain type of nut or knurled nut, it will be evident that the invention is not limited thereto, as in general it may be applied to many types with slight modifications.

Having described my invention, what I claim is:

1. In apparatus for applying a nut to a threaded member, a guideway for the nuts, means for feeding the nuts to the guideway and a reciprocating chuck having yielding jaws adapted to receive the nuts from the guideway and rotate them.

2. In apparatus for applying a nut to a threaded member, a hopper, a guideway for the nuts, means for feeding nuts from the hopper to the guideway, a rotating and reciprocating chuck connected to the guideway having yielding jaws adapted to grip a nut and rotate it therewith, and means for successively feeding nuts into said gripping means.

3. In apparatus for applying a nut to a threaded member, a hopper, a flexible guideway for the nuts, means for feeding nuts from the hopper to the guideway, a rotating chuck connected to the guideway adapted to be moved into proximity with the threaded member to apply a nut thereto; said chuck having flexible jaws adapted to grip a nut and release it upon withdrawing the chuck from the threaded member, and means for feeding another nut into said flexible jaws when the first mentioned nut is removed.

4. In apparatus for applying a nut to a threaded member, a hopper, a flexible guideway for the nuts, means for feeding the nuts from the hopper and alining them on the guideway, a rotating chuck connected to the guideway adapted to be moved into proximity with the threaded member to apply a nut thereto, said chuck having flexible jaws adapted to grip a nut and release it upon withdrawing the chuck from the threaded member, and means for feeding another nut into said flexible jaws when the first mentioned nut is removed.

5. In apparatus for applying a nut having a groove in its periphery to a threaded member, a hopper, a flexible guideway for the nuts, means for feeding the nuts from the hopper, means adapted to engage said groove to aline the nuts on the guideway, a rotating chuck connected to the guideway adapted to be moved against the end of the threaded member to apply a nut thereto, said chuck having flexible jaws adapted to rotatably grip a nut and release it upon withdrawing the chuck from the threaded member, and means for feeding another nut into said flexible jaws when the first mentioned nut is removed.

6. In apparatus for applying a nut to a threaded member, a guideway for the nuts, means for feeding the nuts to the guideway, and a chuck movable horizontally and vertically whereby it may be moved against the end of the threaded member to apply a nut thereto, said chuck being connected to the guideway and having rotating flexible jaws adapted to grip a nut.

7. In apparatus for applying a nut having a groove in its periphery to a threaded member, a guideway consisting of two strips space apart and adapted to engage said groove, means for feeding the nuts between the strips, and a rotating chuck adapted to receive the nuts from the guideway and rotate them.

8. In apparatus for applying a nut having a groove in its periphery to a threaded member, a guideway consisting of two strips spaced apart and adapted to engage said groove, a movable plate adapted to receive a plurality of nuts and move them therewith, means for feeding nuts to the plate and a rotating chuck connected to the guideway adapted to be moved against the end of the threaded member to apply a nut thereto.

9. In apparatus for applying a nut having a groove in its periphery to a threaded member, a hopper, a rotating plate adapted to receive a plurality of nuts from the hopper and move them therewith, a guideway consisting of two strips spaced apart and adapted to engage said groove, said strips projecting into the path of the moving nuts whereby the nuts are fed to the guideway, and a rotating chuck adapted to receive the nuts from the guideway and rotate them.

10. In apparatus for applying a nut having a groove in its periphery to a threaded member, a rotating plate adapted to receive a plurality of nuts from the hopper and move them, a guideway consisting of two strips spaced apart and adapted to engage said groove, said strips terminating at one end with fingers supported above said plate a distance less than the thickness of the nuts and projecting into the path of the moving nuts whereby the strips engage the grooves and feed the nuts to the guideway, and a rotating chuck adapted to receive the nuts from the guideway and rotate them.

11. In apparatus for applying a nut to a threaded member, said nut having a groove in its periphery nearer one end than the other, a rotating plate adapted to receive a plurality of nuts and move them therewith, a guideway consisting of two strips spaced apart and adapted to engage said groove, said strips projecting into the path of the moving nuts whereby the strips engage the grooves and feed nuts to the guideway, an obstruction having its lower edge above the strips a distance slightly less than half the thickness of the nuts, said obstruction being adapted thereby to engage the nuts entering the strips in certain positions and to allow others to pass to the guideway, and a rotating chuck adapted to receive the nuts from the guideway and rotate them.

12. In apparatus for applying a nut to a threaded member, said nut having a groove in its periphery nearer one end than the other, a rotating plate adapted to receive a plurality of nuts and move them therewith, a guideway consisting of two strips spaced apart and adapted to engage said groove, said strips terminating at one end with fingers supported above said plate a distance less than the thickness of the nuts and projecting into the path of the moving nuts whereby the fingers engage the grooves and feed nuts to the guideway, an obstruction having its lower edge above said fingers a distance slightly less than half the thickness of the nuts, said obstruction being adapted thereby to engage nuts entering the fingers in certain positions and to allow others to pass to the guideway, and a rotating chuck adapted to receive the nuts from the guideway and rotate them.

13. In apparatus for applying a nut to a threaded member, said nut having a groove in its periphery nearer one end than the other, a rotating plate adapted to receive a plurality of nuts and move them therewith, a guideway consisting of two strips spaced apart and adapted to engage said groove, said strips terminating at one end with fingers supported above said plate a distance less than the thickness of the nuts and projecting into the path of the moving nuts whereby the strips engage the grooves and feed the nuts to the guideway, movable means having its lower edge above the fingers a distance slightly less than half the thickness of the nut, said means being adapted to remove nuts entering the fingers in certain positions and to allow others to pass to the guideway, and a rotating chuck adapted to receive the nuts from the guideway and rotate them.

14. In apparatus for applying a nut to a threaded member, said nut having a groove in its periphery nearer one end than the other, a movable conveyer adapted to receive a plurality of nuts and move them, a guideway consisting of two strips spaced apart and adapted to engage said groove, said strips projecting into the path of the moving nuts whereby the strips engage the grooves and feed nuts to the guideway, a rotating wheel having a plurality of notches in its periphery, said wheel having its lower edge above the fingers a distance slightly less than half the thickness of the nuts whereby the wheel is adapted to knock certain nuts out of the track to allow the others to pass to the guideway, and a rotating chuck adapted to receive the nuts from the guideway and rotate them.

15. In apparatus for applying a nut to a threaded member, said nut having a groove in its periphery nearer one end than the other, a rotating plate adapted to receive a plurality of nuts and move them therewith, a guideway consisting of two strips spaced apart and adapted to engage said groove, said strips terminating at one end with fingers supported above the plate a distance less than the thickness of the nuts and projecting into the path of the moving nuts whereby the strips engage the grooves and feed nuts to the guideway, a rotating wheel having a plurality of notches in its periphery, said wheel having its lower edge above the fingers a distance slightly less than half the thickness of the nuts whereby the wheel is adapted to knock certain nuts out of the track and to allow the others to pass to the guideway, and a rotating chuck adapted to receive the nuts from the guideway and rotate them.

16. In apparatus for applying a grooved nut to a threaded member, a hopper, a guideway for the nuts consisting of two flexible strips spaced apart and adapted to engage said groove, means for feeding the nuts between the strips, means for feeding nuts from the hopper to the first mentioned means, and a chuck adapted to receive nuts from the guideway and rotate them.

17. In apparatus for applying a nut to a threaded member, a hopper, a guideway for the nuts, a rotating plate adapted to receive a plurality of nuts and move them therewith to feed them into the guideway, a slide movable in said hopper adapted to deposit nuts on the plate, and a chuck adapted to receive nuts from the guideway and rotate them.

18. In apparatus for applying a nut having a groove in its periphery to a threaded member, a hopper, a guideway for the nuts consisting of two flexible strips spaced apart and adapted to engage said groove, a rotating plate adapted to receive a plurality of nuts and move them therewith, a guard around the plate having an opening for the passage of the guideway and nuts, a slide movable in the hopper adapted to deposit nuts on the plate from time to time as the plate becomes partially empty, and a chuck adapted to receive nuts from the guideway and rotate them.

19. In apparatus for applying a nut to a threaded member, a supporting standard, a hopper, a feed screw secured thereto and adapted to be rotated to raise and lower the hopper, a rotating plate, means for feeding nuts from the hopper to the rotating plate, a pair of fingers above the plate, said fingers being spaced apart and adapted to permit nuts to enter therebetween, a guideway attached to the fingers and a rotating chuck adapted to receive the nuts from the guideway and rotate them.

20. In apparatus for applying a nut to a threaded member, a hopper, a rotating plate, a slide passing through the hopper adapted to feed nuts to the plate, and means for intermittently operating the slide dependent on the quantity of nuts on the plate.

21. In apparatus for applying a nut to a threaded member, a hopper, a rotating plate, a slide passing through the hopper adapted to feed nuts to the plate, means for intermittently operating the slide dependent on the quantity of nuts on the plate, a guideway consisting of two strips spaced apart and adapted to engage said groove, and a rotating chuck adapted to receive the nuts from the guideway and rotate them.

22. In apparatus for applying a nut to a threaded member, a movable plate, intermittently operated means for feeding nuts to the plate, means reciprocating above the plate adapted to engage a nut thereon, and a clutch adapted to coöperate with the nut feeding and reciprocating means to place the feeding means in operation only when the plate is sufficiently emptied so that said reciprocating means does not engage a nut.

23. In apparatus for applying a nut to a threaded member, a movable plate, an intermittently operated slide for feeding nuts to the plate, an oscillating finger adapted to engage a nut on the plate, and a clutch adapted to coöperate with the slide and finger to place the slide in operation only when said reciprocating means does not engage a nut on the plate.

24. In apparatus for applying a nut to a threaded member, a hopper, a rotating plate, a slide for feeding nuts to the plate, a yieldingly resisting finger adapted to engage a nut on the plate, means for oscillating said finger over the plate, a rotating clutch member connected to the finger and adapted to be connected to the slide, and clutch controlling means adapted to place the slide and clutch in operative connection whenever the finger does not engage a nut.

25. In apparatus for applying a nut to a threaded member, a hopper, a movable plate, a slide adapted to feed nuts to the plate, a rotating shaft, a crank connected to the shaft, a pivoted finger adapted to engage a nut on the plate, a flexible arm connected between the finger and the crank to raise and lower the finger, a rotating clutch member on the shaft and clutch controlling means for placing the slide and clutch in operative connection whenever the finger does not engage a nut on the plate.

26. In apparatus for applying a nut to a threaded member, a hopper, a rotating plate, a slide for feeding nuts to the plate, a rotating shaft, a crank connected to the shaft, a pivoted finger adapted to engage a nut on the plate, a flexible arm connected between the finger and the crank, a clutch consisting of a member keyed to the shaft and a second member loosely mounted on the shaft and connected to the slide, adapted to coöperate with the first part to connect the slide and the rotating clutch member.

27. In apparatus for applying a nut to a threaded member, a hopper, a rotating plate, a slide adapted to feed nuts to the plate, a rotating shaft, a crank connected to the shaft, a clutch consisting of a member keyed to the shaft and a second member loosely mounted on the shaft adapted to coöperate with the first part to connect the slide and rotating clutch member, and a link connected between the slide and the loose clutch member.

28. In apparatus for applying a nut to a threaded member, a hopper, a rotating plate, a slide for feeding nuts to the plate, a pivoted finger adapted to engage a nut on the plate, means for raising and lowering the finger and an arm connected to the finger adapted to connect the rotating clutch member and slide.

29. In apparatus for applying a nut to a threaded member, a hopper a rotating plate, a slide adapted to feed nuts to the plate, a pivoted finger adapted to engage a nut on the plate, means for oscillating the finger over the plate, a shaft, a clutch member thereon, a second clutch member loosely fitted on the shaft, an arm connected with the finger adapted to connect the two clutch members, and a link between the slide and loose clutch member.

30. In apparatus for applying a nut to a threaded member, a hopper, a rotating plate, a slide for feeding nuts to the plate, a rotating shaft, a crank connected to the shaft, a pivoted finger, an arm connected to the crank for raising and lowering the finger, a clutch consisting of two parts, one keyed and the other loosely fitted on the shaft, a reciprocating stem operated from the shaft adapted to place the clutch members in operative connection, and an arm connected to the finger adapted to control the stem whereby the clutch members are disconnected whenever the finger engages a nut.

31. In apparatus for applying a nut to a threaded member, a movable plate, means for feeding nuts to the plate, a guideway for the nuts, means for feeding nuts to the guideway, a chuck adapted to receive nuts from the guideway and apply them to the threaded member, and an escapement adapted to feed nuts from the guideway to the chuck one at a time.

32. In apparatus for applying a nut to a threaded member, a movable plate, means for feeding nuts to the plate, a guideway for the nuts, means for feeding nuts to the guideway, a chuck adapted to receive nuts from the guideway and apply them to the threaded member, an escapement for releasing the nuts on the guideway and means connected to the chuck adapted to operate the escapement whenever a nut is applied to a rod.

33. In apparatus for applying a nut to a threaded member, a hopper, a rotating plate, means for feeding nuts to the plate, a guideway for the nuts, means for feeding nuts from the hopper to the guideway, a chuck adapted to receive nuts from the guideway and apply them to the threaded member, a pair of fingers connected together and projecting into the path of the nuts, and means for reciprocating the fingers to feed nuts to the guideway.

34. In apparatus for applying a nut to a threaded member, a hopper, a rotating plate, means for feeding nuts to the plate, means for feeding nuts to the guideway, a chuck adapted to receive nuts from the guideway and apply them to the threaded member, an escapement projecting into the path of the nuts, an electromagnet for operating said escapement and means for opening and closing the circuit of the electromagnet when a nut is applied to a rod.

35. In apparatus for applying a nut to a threaded member, a hopper, a rotating plate, means for feeding nuts to the plate, a guideway for the nuts, means for feeding nuts to the guideway, a chuck for applying a nut to a threaded member, said chuck having two relatively movable parts, a contact on each part, an escapement for releasing nuts on the guideway one at a time, an electromagnet adapted to operate the escapement, the circuit of the electromagnet being adapted to be opened and closed by the relative movement between the chuck parts when the nut is applied.

36. In apparatus for applying a nut to a threaded member, a hopper, a rotating plate, means for feeding nuts to the plate, a guideway for the nuts, means for feeding nuts to the guideway, a chuck adapted to receive nuts from the guideway and apply them to the threaded member, said chuck having two relatively movable parts, a pair of fingers connected together and projecting into the path of the nuts, means for reciprocating the fingers to feed nuts to the guideway, an escapement projecting into the path of the nuts, an electromagnet for operating the escapement, the circuit of the electromagnet being adapted to be opened and closed by the relative movement between the chuck parts when a nut is applied.

37. In apparatus for applying a nut to a threaded member, a hopper, a rotating plate, means for feeding nuts to the plate, a guideway, a chuck adapted to receive the nuts and apply them to the threaded member, a pair of fingers connected together and projecting into the path of the nuts on the guideway, means for reciprocating the fingers to feed the nuts to the chuck, said fingers being spaced apart a distance approximately equal to the diameter of the nuts and adapted to alternately project into the path of the nuts, an electromagnet for operating the fingers, the circuit of the electromagnet being adapted to be opened and closed by the relative movement between the chuck parts when a nut is applied.

38. In apparatus for applying a nut to a threaded member, a guideway for the nuts, means for feeding nuts thereto, means for removing the nuts from the feeding means when these are not adapted to enter the guideway, and a chuck adapted to receive the nuts from the guideway and rotate them.

39. In apparatus for applying a nut to a threaded member, a guideway, a receptacle, means for feeding nuts from the receptacle to the guideway and means for opening said receptacle to remove the nuts when imperfect nuts accumulate therein.

40. In apparatus for applying a nut to a threaded member, a guideway, a receptacle, means for feeding nuts from the receptacle to the guideway, means for opening the receptacle to remove the nuts when imperfect nuts accumulate in the receptacle and means adapted to remove nuts from the guideway which become clogged therein.

41. In apparatus for applying a nut to a threaded member, a guideway, a rotating receptacle for feeding nuts to the guideway, means for opening the receptacle to empty it and a finger adapted to slide along the guideway to remove nuts therefrom.

42. In apparatus for applying a nut having a groove in its periphery to a threaded member, a guideway consisting of two strips spaced apart and adapted to engage said groove, means for feeding the nuts between the strips, and a pivoted finger movable along the guideway to engage the nuts thereon and remove them therefrom whenever the guideway becomes clogged.

43. In apparatus for applying a nut having a groove in its periphery to a threaded member, a guideway consisting of two strips spaced apart and adapted to engage said groove, means for feeding the nuts between the strips, a rotating plate having a stationary guard around the edge, a section of said guard being pivoted whereby the guard may be opened to remove the nuts thereon, and a pivoted finger movable along the guideway to engage the nuts thereon and remove them therefrom whenever the guideway becomes clogged.

44. In apparatus for applying a nut having a groove in its periphery to a threaded member, a guideway consisting of two strips spaced apart and adapted to engage said groove, means for feeding the nuts between the strips, a rotating plate having a stationary guard around the edge, a section of said guard being pivoted whereby the guard may be opened to remove the nuts thereon, a pivoted finger movable along the guideway to engage the nuts thereon and remove them therefrom whenever the guideway becomes clogged, and means for simultaneously opening the guard section and turning the finger to clear the plate of nuts.

45. In apparatus for applying a nut having a groove in its periphery to a threaded member, a guideway consisting of two strips spaced apart and adapted to engage said groove, means for feeding the nuts between the strips, a rotating plate having a stationary guard around the edge, a section of said guard being pivoted whereby the guard may be opened to remove the nuts on the plate, a pivoted finger movable along the guideway to engage the nuts thereon and remove them therefrom, means for simultaneously opening the guard section and turning the finger to clear the plate, and a receptacle mounted alongside the open portion of the guard adapted to receive the nuts removed from the plate.

46. In apparatus for applying a nut to a threaded member, a guideway, a chuck adapted to receive nuts from the guideway and rotate them, said chuck being movable in a horizontal and a vertical plane.

47. In apparatus for applying a nut to a threaded member, a guideway, a chuck adapted to receive nuts from the guideway and rotate them, a frame for supporting the chuck, said frame being pivoted to permit movement of the chuck in a vertical plane, and a swinging arm for supporting the frame.

48. In apparatus for applying a nut to a threaded member, a chuck adapted to receive nuts from the guideway and rotate them, a frame for supporting the chuck, an arm movable in a horizontal plane for carrying the frame, and a bracket loosely fitted in one end of the arm, said bracket having arms for pivotally supporting the frame therebetween.

49. In apparatus for applying a nut to a threaded member, a guideway, a chuck adapted to receive nuts from the guideway and rotate them, a pivoted bracket adapted to be moved in a horizontal plane, a frame for carrying the chuck pivotally mounted between the arms of the bracket to permit movement of the chuck in a vertical plane, and means for yieldingly resisting said vertical movement.

50. In apparatus for applying a nut to a threaded member, a pivoted bracket adapted to be moved in a horizontal plane, a frame pivotally mounted between the arms of the bracket to permit movement of the frame in a vertical plane, a chuck connected to the supporting frame at one end and a spring connected to the frame adapted to yieldingly resist said vertical movement.

51. In apparatus for applying a nut to a threaded member, a supporting standard, a horizontally movable arm fastened thereto, a bracket mounted in one end of the arm, a frame pivotally mounted between the arms of the bracket, a rod projecting from the platform, a chuck mounted at the end of the rod and a spring connected between the bracket and the frame to yieldingly resist the movement of the chuck in a vertical plane.

52. In apparatus for applying a nut to a threaded member, a supporting standard, a horizontally movable arm fastened thereto, a bracket mounted on one end of the arm, a frame pivotally mounted between the arms of the bracket, a rod projecting from the frame, a chuck mounted at the end of the rod, a motor mounted on the frame adapted to rotate the chuck, and a spring connected between the bracket and the frame to yieldingly resist movement of the chuck in a vertical plane.

53. In apparatus for applying a nut to a threaded member, a supporting standard, a horizontally movable arm fastened thereto, a bracket mounted in one end of the arm, a frame pivotally mounted between the arms of the bracket to permit movement in a vertical plane, a hollow rod projecting from the frame, a chuck mounted at the end of the rod, a shaft passing through the hollow rod and connected to the chuck, and a motor mounted on the frame adapted to rotate the shaft.

54. In apparatus for applying a nut to a threaded member, a chuck adapted to receive nuts and rotate them, said chuck having a rotating nut engaging element and means for yieldingly supporting the chuck to permit horizontal and vertical movement of the chuck elements toward the rod to apply a nut thereto.

55. In apparatus for applying a nut to a threaded member, a chuck adapted to receive nuts and rotate them, said chuck having a rotating nut engaging element and a nut feeding element slidable on the nut rotating element.

56. In apparatus for applying a nut to a threaded member, a chuck adapted to receive nuts and rotate them, said chuck having a rotating nut engaging element and a nut feeding element slidable on the nut rotating element, and means for yieldingly supporting the chuck adapted to permit the chuck elements to be moved toward a threaded member to apply a nut thereto.

57. In apparatus for applying a nut to a threaded member, a chuck adapted to receive nuts and rotate them, said chuck having a rotating nut engaging element and a nut feeding element slidable on the nut rotating element, and a pivoted carrying arm for the chuck adapted to permit the chuck elements to be moved therewith toward the threaded member to apply a nut thereto.

58. In apparatus for applying a nut to a threaded member, a pivoted horizontal arm adapted to be moved in a vertical plane, a chuck fitted to one end of the arm, said chuck consisting of a nut engaging element vertically suspended from the arm, and a nut feeding element slidable on the nut engaging element.

59. In apparatus for applying a nut to a threaded member, a hollow pivoted arm adapted to be moved in a vertical plane, a rotating shaft in the arm, a chuck fitted to one end of the arm, said chuck consisting of an element for rotating a nut geared to the shaft and a nut feeding element slidably mounted on the nut rotating element.

60. In apparatus for applying a nut to a threaded member, a hollow arm, a rotating shaft in the arm, a chuck consisting of a tube rotatably connected to the shaft and suspended from the arm, and a guideway for feeding nuts to the tube.

61. In apparatus for applying a nut to a threaded member, a hollow arm, a rotating shaft in the arm, a chuck consisting of a tube geared to the shaft and vertically suspended from the arm and open at the top, a guideway for carrying nuts side by side adapted to carry the nuts to the opening in the top of the tube, and means for preventing the nuts from tipping when they enter the tube.

62. In apparatus for applying a nut to a threaded member, a chuck consisting of a tubular nut rotator, a guideway for carrying nuts side by side to one end of the tube, and means for preventing the nuts from tipping when they leave the guideway and enter the tube.

63. In apparatus for applying a nut to a threaded member, a tubular chuck adapted to carry nuts in end to end relation, a guideway for carrying nuts side by side to one end of the chuck, and means for preventing the nuts from tipping when they enter the open end.

64. In apparatus for applying a nut to a threaded member, a chuck having a vertical passage therethrough adapted to receive nuts placed in end to end relation, a guideway for carrying nuts side by side to the open end, the end of said guideway adjacent the passage being substantially perpendicular thereto, and a yielding arm adapted to bear on the nuts at the end of the guideway and over the vertical passage to prevent tipping.

65. In apparatus for applying a nut to a threaded member, a chuck having a vertical passage therethrough adapted to receive nuts placed in end to end relation, a guideway for carrying nuts side by side to the open end, and a pivoted arm over the passage and end of the guideway adapted to bear on the nuts to prevent tipping.

66. In apparatus for applying a nut to a threaded member, a rotating chuck having flexible jaws for engaging and rotating a nut to apply it to the threaded member, means for withdrawing the jaws from the member to remove the nut from the jaws, and means for feeding a nut into the jaws when they are withdrawn from the threaded member.

67. In apparatus for applying a nut to a threaded member, a chuck having flexible rotating jaws for engaging a nut, means for moving the jaws downward to apply the nut therein to a threaded member, means for raising the jaws from the rod to remove the nut from the jaws and means for feeding a nut into the jaws when said jaws are raised from the threaded member.

68. In apparatus for applying a nut to a threaded member, a plurality of rotatable nut engaging jaws, a hollow tube for conveying nuts thereto, a guideway for the nuts, an escapement thereon and means movable up and down on the tube for feeding nuts to the jaws, said means being adapted to simultaneously operate the escapement to feed nuts from the guideway to the tube.

69. In apparatus for applying a nut to a threaded member, a plurality of rotatable nut engaging jaws, a hollow tube for conveying nuts thereto, a guideway for carrying nuts to the tube, an escapement, electromagnetic means for operating the escapement, means movable up and down on the tube for feeding nuts to the jaws, a contact connected with the tube and a second contact coöperating therewith connected with the feeding means, said contacts being adapted to open and close the electric circuit of the electromagnet to operate the escapement and feed a nut from the guideway to the tube when a nut is applied to a threaded member.

70. In apparatus for applying a nut to a threaded member, a chuck having flexible rotating jaws for engaging a nut, a tube for conveying nuts thereto, means for moving the jaws to apply the nut therein to a threaded member, means for separating the jaws and threaded member, and means engaging the nut movable on the tube toward the jaws when the jaws and threaded member are separated to feed another nut into the jaws.

71. In apparatus for applying a nut to a threaded member, a chuck having flexible rotating jaws for engaging a nut, a tube for conveying nuts thereto, means for moving the jaws to apply the nut therein to a threaded member, means for separating the jaws and threaded member to remove the nut from the jaws, a pair of dogs on the tube and means for moving the dogs toward the jaws when the jaws and threaded member are separated to feed another nut into the jaws.

72. In apparatus for applying a nut to a threaded member, a tube having flexible rotating jaws for engaging a nut, means for moving the jaws downward to apply the nut therein to a threaded member, means for raising the jaws from the member to remove the nut from the jaws, a slide surrounding the tube, a pair of dogs attached to the slide and means for moving the tube and slide in opposite directions when the jaws are removed from the threaded member to force another nut into the jaws.

73. In apparatus for applying a nut having a groove to a threaded member, a tube having flexible rotating jaws for engaging the nut, means for moving the jaws downward to apply the nut therein to a threaded member, a slide surrounding the tube, a pair of pivoted dogs attached to the slide and fitted between the flexible jaws, said dogs being adapted to engage the groove of a second nut and means for moving the tube and slide in opposite directions when the jaws are moved downward, said dogs being adapted to be moved out of engagement with the second nut at the beginning of the downward movement and into engagement with a third nut located just above the second nut at the end of said downward movement.

74. In apparatus for applying a nut having a groove to a threaded member, a tube having flexible rotating jaws for engaging a nut, means for moving the jaws downward to apply the nut therein to a threaded member, a slide surrounding the tube, a pair of pivoted dogs attached to the slide and fitted between the flexible jaws, said dogs having pointed ends, and an inclined upper edge adjoining said end for engaging the groove of a second nut, means for moving the tube and slide in opposite directions when the jaws are moved downward, means connected to the tube adapted to engage the groove of said second nut, the inclined edge of said dogs being adapted to engage the edge of said second nut and move the dogs out of engagement at the beginning of said downward movement of the jaws, and means for forcing the dogs into engagement with the groove of a third nut located above the second nut at the end of said downward movement.

75. In apparatus for applying a nut having a groove to a threaded member, a tube having flexible rotating jaws for engaging a nut, means for moving the jaws downward to apply the nut therein to a threaded member, means for raising the jaws from the member to remove the nut from the jaws, a slide surrounding the tube, a pair of pivoted dogs attached to the slide and fitted between the flexible jaws, said dogs being adapted to engage the groove of a second nut, and means for moving the tube and slide in opposite directions when the jaws are removed from the threaded member to force another nut into the jaws.

76. In apparatus for applying a nut having a groove to a threaded member, a tube having flexible rotating jaws for engaging a nut, means for moving the jaws downward to apply the nut therein to a threaded member, means for raising the jaws from the threaded member to remove the nut from the jaws, a pair of pivoted dogs connected to the tube adapted to engage the groove of a second nut, said dogs being adapted to be moved out of engagement with the groove of the second nut at the beginning of the upward movement of the jaws and into engagement with a third nut just above the second nut at the end of said upward stroke.

77. In apparatus for applying a nut having a groove to a threaded member, a tube having flexible rotating jaws for engaging the nut, means for moving the jaws downward to apply the nut therein to a threaded member, means for raising the jaws from the member to remove the nut from the jaws, a pair of pivoted dogs connected to the tube adapted to engage the groove of a second nut, means for moving said dogs out of engagement with the groove of the second nut at the beginning of the upward movement of the jaws, and means for moving the dogs into engagement with a third nut just above said second nut at the end of said upward stroke.

78. In apparatus for applying a nut having a groove to a threaded member, a tube having flexible rotating jaws for engaging a nut, means for moving the jaws downward to apply the nut therein to a threaded member, means for raising the jaws from the member to remove the nut from the jaws, a slide surrounding the tube, a pair of pivoted dogs attached to the slide and fitted between the flexible jaws adapted to engage the groove of a nut, a second pair of pivoted dogs connected to the tube adapted to engage the groove of a nut, and means for moving the tube and slide in opposite directions when the jaws are removed from the threaded member to force another nut into the jaws.

79. In apparatus for applying a nut having a groove to a threaded member, a chuck having flexible rotating jaws for engaging a nut, means for moving the jaws downward to apply the nut therein to a threaded member, means for raising the jaws from the member to remove the nut from the jaws, a slide surrounding the tube, a pair of pivoted dogs attached to the slide and fitted between the flexible jaws, means for pressing said dogs into the groove of a nut, a second pair of pivoted dogs connected to the tube, means for pressing the said second pair of dogs into the groove of a nut, and means for moving the slide and tube in opposite directions relatively when the jaws are removed from the threaded member to force another nut into the jaws.

80. In apparatus for applying a nut having a groove to a threaded member, a chuck having flexible rotating jaws for engaging a nut, means for moving the jaws downward to apply the nut therein to a threaded member, means for raising the jaws from the member to remove the nut from the jaws, an arm for suspending the chuck, a slide surrounding the tube, a pair of pivoted dogs attached to the slide and fitted between the flexible jaws, means for pressing the dogs into the groove of a nut, a second pair of pivoted dogs connected to the tube and adapted to engage the groove of a nut, means for pressing the second pair of dogs into the groove, a casing surrounding the tube and slide, and means for normally drawing the casing toward the tube.

81. In apparatus for applying a nut having a groove to a threaded member, a chuck having flexible rotating jaws for engaging a nut, means for moving the jaws downward to apply the nut therein to a threaded member, means for raising the jaws from the member to remove the nut from the jaws, an arm for suspending the chuck, a slide surrounding the tube, a pair of pivoted dogs attached to the slide and fitted between the flexible jaws, means for pressing the dogs into the groove of a nut, a second pair of pivoted dogs connected to the tube and adapted to engage the groove of a nut, means for pressing the second pair of dogs into the groove, a casing surrounding the tube and slide, means for normally drawing the casing toward the tube, a casing surrounding the tube and slide and slidable thereon, a tension spring normally drawing the tube and casing together, and means for overcoming the force of the spring to separate the tube and casing.

82. In apparatus for applying a nut having a groove to a threaded member, a tube having flexible rotating jaws for engaging a nut, a movable arm for suspending the tube, a compression spring for resisting said movement, means for moving the jaws downward to apply the nut therein to a member, said spring being adapted to raise the jaws from the member to remove the nut from the jaws, a slide surrounding the tube, a pair of pivoted dogs attached to the slide and fitted between the flexible jaws, means for pressing the dogs into the groove of the nut, a second pair of pivoted dogs connected to the tube, means for pressing said second pair of dogs into the groove of the nut, a casing surrounding the tube and slide and slidable thereon, a spring normally drawing the tube and casing together, a handle pivoted on the casing having a projecting end adapted to overcome the spring and lower the tube.

83. In apparatus for applying a nut having a groove to a threaded member, a guideway for the nuts consisting of two flexible strips spaced apart, an electromagnetic escapement on the guideway, an electric circuit adapted to be opened and closed to control said escapement, a tube having flexible jaws for engaging a nut, said tube being connected to the guideway and adapted to receive nuts therefrom, a lever pivoted over said tube and guideway to prevent the nuts from tipping when they leave the guideway and enter the tube, a hollow arm for suspending the tube at one end thereof, a frame for supporting the hollow arm, a motor on the frame, a shaft connected to the motor and passing through the hollow arm, a gear on the shaft and a second gear on the tube adapted to coöperate to rotate the tube, a projection on said arm carrying a terminal of the electric circuit, a downwardly extending rod attached to the arm, a bracket having two arms for pivotally carrying the frame, a compression spring fitted between the frame and the bracket, a standard, a horizontal arm pivoted on the standard having a bearing for said bracket, a collar on the tube, a slide having a tubular end surrounding the collar, a sleeve attached to the tubular end of the slide surrounding the tube, a compression spring between the collar and sleeve, a gear wheel rotatably mounted on the tube, a rack attached to the slide and meshing with the gear, a pair of pivoted dogs suspended from the sleeve and fitted between the flexible jaws, said dogs having pointed lower ends adapted to engage a groove of a nut, and an upper inclined edge adjoining said pointed ends, a spring for forcing the pointed ends into the groove of a nut, a second pair of dogs pivotally suspended from the tube fitted between the flexible jaws, said last mentioned dogs having pointed lower projecting ends adapted to engage a groove of a nut, a pair of springs for forcing the ends into the groove of a nut, a casing surrounding the slide and tube, a rack fastened on the interior of the casing and meshing with the gear on the side opposite to the side in engagement with the rack attached to the slide, a second terminal of the electric circuit attached to a projection of the casing and adapted to coöperate with the first terminal to close the circuit, a tension spring attached between the upper end of the depending rod and the casing, and a handle pivoted on a projection of the casing, said handle having a notched end adapted to receive the end of the depending rod and to be depressed against the force of said tension spring whereby the hollow arm is depressed against the force of the compression spring fitted between the bracket and frame to apply a nut to a threaded member and to close the electric circuit to operate the escapement and feed a nut to the tube.

In testimony whereof I hereunto affix my signature.

H. W. JONES.